(12) United States Patent
Powers

(10) Patent No.: US 10,533,615 B1
(45) Date of Patent: Jan. 14, 2020

(54) PROGRESSIVE SHEAR ASSEMBLIES

(71) Applicant: Charles S. Powers, Shreveport, LA (US)

(72) Inventor: Charles S. Powers, Shreveport, LA (US)

( * ) Notice: Subject to any disclaimer, the term of this patent is extended or adjusted under 35 U.S.C. 154(b) by 29 days.

(21) Appl. No.: 16/053,218

(22) Filed: Aug. 2, 2018

Related U.S. Application Data

(60) Provisional application No. 62/541,276, filed on Aug. 4, 2017.

(51) Int. Cl.
*F16D 9/06* (2006.01)
*B63H 1/20* (2006.01)

(52) U.S. Cl.
CPC .............. *F16D 9/06* (2013.01); *B63H 1/20* (2013.01)

(58) Field of Classification Search
CPC .............. F16D 9/06; F16D 9/08; B63H 1/20
See application file for complete search history.

(56) References Cited

U.S. PATENT DOCUMENTS

| | | |
|---|---|---|
| 2,326,450 A | 8/1943 | Fawick |
| 2,848,883 A | 8/1958 | Dall'Olio |
| 3,620,044 A | 11/1971 | LaTour |
| 4,086,012 A | 4/1978 | Buckley et al. |
| 4,344,306 A | 8/1982 | Citron |
| 4,389,203 A | 6/1983 | Duntzen |
| 4,750,685 A | 6/1988 | Frei |
| 7,086,836 B1 | 8/2006 | Sheth et al. |
| 7,578,744 B2 | 8/2009 | Park |
| 7,883,422 B2 | 2/2011 | Takamura et al. |
| 8,277,269 B1 * | 10/2012 | Alby ............ B63H 23/34 416/2 |
| 2005/0186861 A1 * | 8/2005 | Powers ............ B63H 1/14 440/49 |

* cited by examiner

*Primary Examiner* — Eldon T Brockman
(74) *Attorney, Agent, or Firm* — R. Keith Harrison

(57) ABSTRACT

A progressive shear assembly includes a hub configured for coupling to the output, the hub including a hub drive sleeve and at least one torque transfer lug on the hub drive sleeve. A drive adaptor may be configured for coupling to the drive. The drive adaptor may include an adaptor shaft disposed in the hub drive sleeve of the hub. The adaptor shaft may have an aft shaft end and a fore shaft end and tapering from the aft shaft end to the fore shaft end. At least one adaptor lug may be provided on the adaptor shaft. The at least one adaptor lug may have a substantially non-uniform width from the aft shaft end to the fore shaft end of the adaptor shaft. A tensile spring may be formed by selected ones of a plurality of substantially incompressible shear members and a plurality of substantially compressible compression members disposed adjacent to the adaptor shaft between the at least one adaptor lug and the at least one torque transfer lug. The at least one adaptor lug on the adaptor shaft of the drive adaptor may pre-load the selected ones of a plurality of substantially incompressible shear members and a plurality of substantially compressible compression members in conical compression. Shear assembly sleeves deployable between a propeller adaptor shaft of a drive adaptor and a propeller hub drive sleeve of a propeller hub are also disclosed.

20 Claims, 19 Drawing Sheets

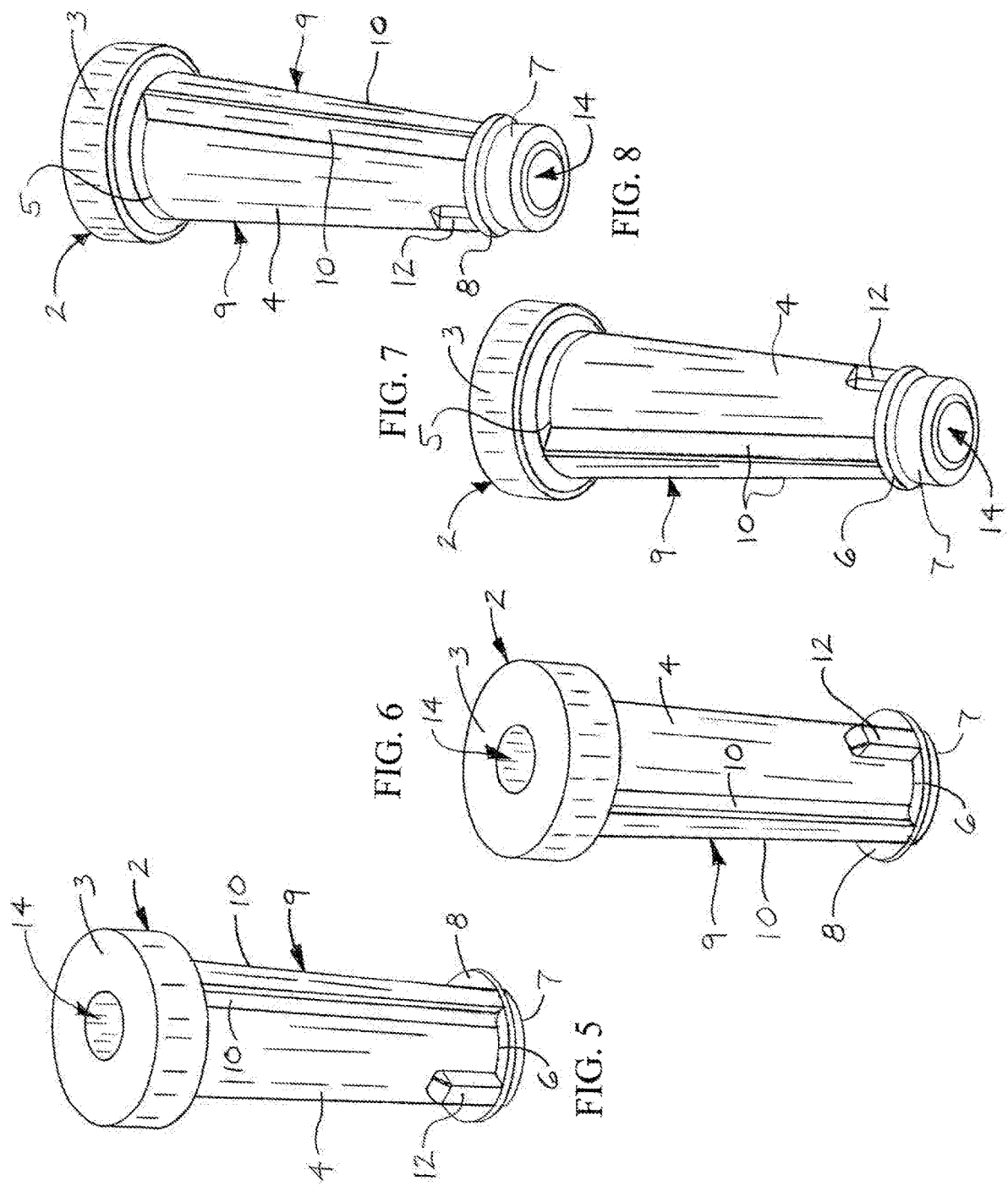

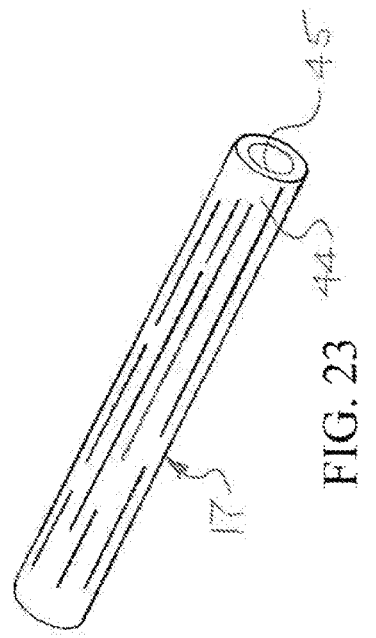
FIG. 22
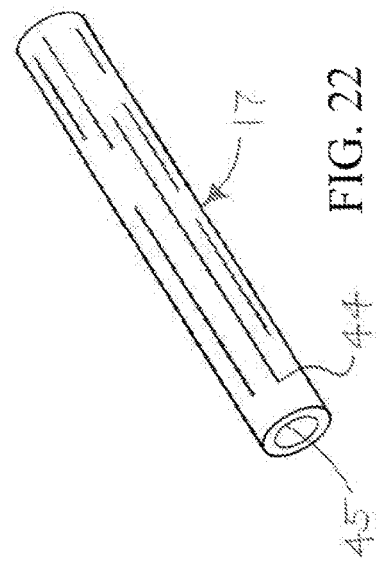
FIG. 23
FIG. 24
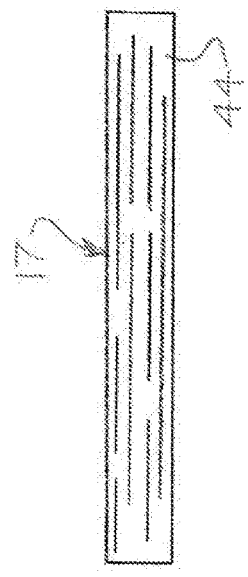
FIG. 25
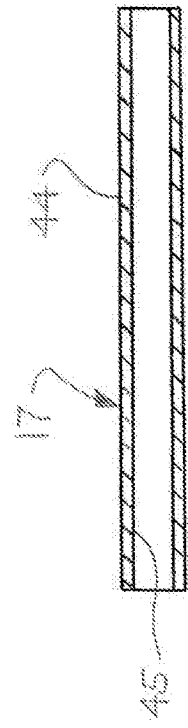
FIG. 26

PROGRESSIVE SHEAR ASSEMBLIES

CROSS-REFERENCE TO RELATED APPLICATIONS

This application claims the benefit of U.S. provisional application No. 62/541,276, filed Aug. 4, 2017, titled PROGRESSIVE SHEAR ASSEMBLY, which provisional application is hereby incorporated by reference herein in its entirety.

FIELD

Illustrative embodiments of the disclosure generally relate to coupling assemblies which transmit torque from a drive to an output. More particularly, illustrative embodiments of the disclosure relate to progressive shear assemblies which may couple a marine propeller to a propeller drive shaft such that a selected resilience and torsional resistance of the propeller with respect to the drive shaft is achieved for different applications of the propeller and may eliminate or reduce deadband or "play" between the propeller and the propeller drive shaft.

SUMMARY

Illustrative embodiments of the disclosure are generally directed to progressive shear assemblies for coupling a drive to an output. An illustrative embodiment of the progressive shear assembly includes a hub configured for coupling to the output, the hub including a hub drive sleeve and at least one torque transfer lug on the hub drive sleeve. A drive adaptor may be configured for coupling to the drive. The drive adaptor may include an adaptor shaft disposed in the hub drive sleeve of the hub. The adaptor shaft may have an aft shaft end and a fore shaft end and tapering from the aft shaft end to the fore shaft end. At least one adaptor lug may be provided on the adaptor shaft. The at least one adaptor lug may have a substantially non-uniform width from the aft shaft end to the fore shaft end of the adaptor shaft. A tensile spring may formed by selected ones of a plurality of substantially incompressible shear members and a plurality of substantially compressible compression members disposed adjacent to the adaptor shaft between the at least one adaptor lug and the at least one torque transfer lug. The at least one adaptor lug on the adaptor shaft of the drive adaptor may pre-load the selected ones of a plurality of substantially incompressible shear members and a plurality of substantially compressible compression members in conical compression.

In some embodiments, an illustrative embodiment of the progressive shear assemblies may include a hub for coupling to the output. The hub may include a hub drive sleeve and at least one torque transfer lug on the hub drive sleeve. A drive adaptor may be configured for coupling to the drive. The drive adaptor may include an adaptor shaft disposed in the hub drive sleeve of the hub, the adaptor shaft having an aft shaft end and a fore shaft end and tapering from the aft shaft end to the fore shaft end. At least one adaptor lug may be provided on the adaptor shaft. The at least one adaptor lug may have a substantially non-uniform width from the aft shaft end to the fore shaft end of the adaptor shaft. A shear assembly sleeve may be deployable between the adaptor shaft of the drive adaptor and the hub drive sleeve of the hub. The shear assembly sleeve may include a sleeve wall having a resilient, flexible and bendable or rollable elastomeric or compressible material. At least one drive input member may be carried by the sleeve wall. The at least one drive input member may include at least one of a substantially incompressible material and a substantially compressible material. At least one drive slot may extend through the sleeve wall adjacent to the at least one drive input member. The at least one adaptor lug may be insertable through the at least one drive slot and engageable with the at least one drive input member. At least one drive output member may be carried by the sleeve wall in spaced-apart relationship to the at least one drive input member. The at least one drive output member may be engageable with the at least one torque transfer lug. A tensile spring may be formable by the at least one drive input member and the at least one drive output member. The at least one adaptor lug on the adaptor shaft of the drive adaptor may be configured to pre-load the at least one drive input member in conical compression.

Illustrative embodiments of the disclosure are further generally directed to a shear assembly sleeve which is deployable between a propeller adaptor shaft of a drive adaptor and a propeller hub drive sleeve of a propeller hub. The shear assembly sleeve may include a sleeve wall having a resilient, flexible and bendable or rollable elastomeric or compressible material. At least one drive input member may be carried by the sleeve wall. The at least one drive input member may include at least one of a substantially incompressible material and a substantially compressible material. At least one drive slot may extend through the sleeve wall adjacent to the at least one drive input member. The at least one adaptor lug may be insertable through the at least one drive slot and engageable with the at least one drive input member. At least one drive output member may be carried by the sleeve wall in spaced-apart relationship to the at least one drive input member. The at least one drive output member may be engageable with the at least one torque transfer lug. A tensile spring may be formable by the at least one drive input member and the at least one drive output member. The at least one adaptor lug on the adaptor shaft of the drive adaptor may be configured to pre-load the at least one drive input member in conical compression.

BRIEF DESCRIPTION OF THE DRAWINGS

Illustrative embodiments of the disclosure will now be described, by way of example, with reference to the accompanying drawings, wherein:

FIG. 5 is a rear perspective view of the illustrative drive adaptor;

FIG. 6 is a rear perspective view of the illustrative drive adaptor, opposite to the position illustrated in FIG. 5;

FIG. 7 is a front perspective view of the illustrative drive adaptor;

FIG. 8 is a front perspective view of the illustrative drive adaptor, opposite to the position illustrated in FIG. 7;

FIGS. 22 and 23 are perspective views, respectively, of a typical shear member suitable for implementation of an illustrative embodiment of the progressive shear assemblies;

FIG. 24 is a side view of the compression member illustrated in FIGS. 22 and 23;

FIG. 25 is an end view of the compression member illustrated in FIGS. 22 and 23;

FIG. 26 is a longitudinal sectional view of the compression member illustrated in FIGS. 22 and 23, more particularly illustrating a shear member bore traversing the shear member;

DETAILED DESCRIPTION

Figure 1:
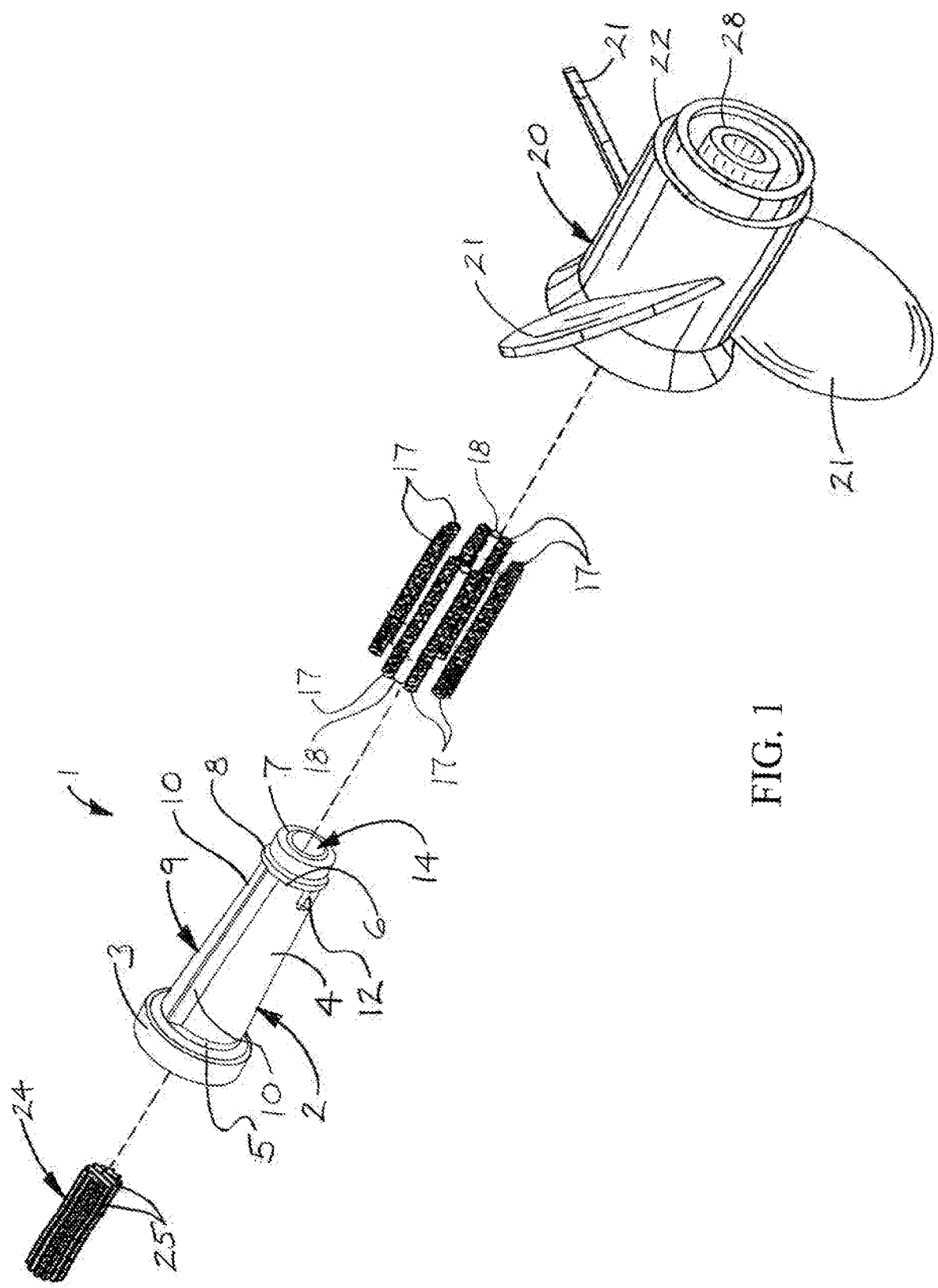
FIG. 1 is an exploded perspective view of an illustrative embodiment of the progressive shear assemblies.
Figure 2:
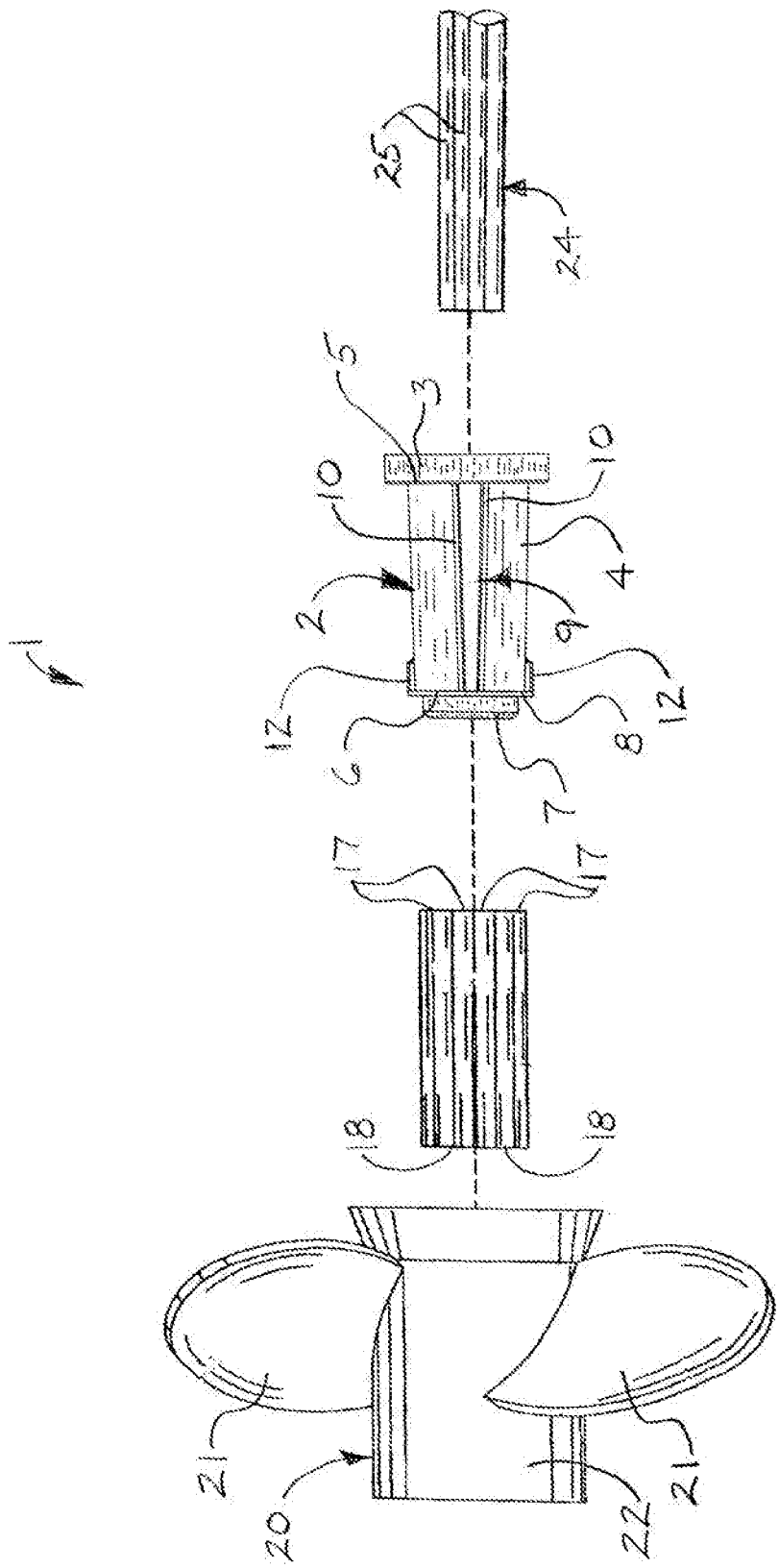
FIG. 2 is an exploded side view of the illustrative progressive shear assembly illustrated in FIG. 1.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the claims. Moreover, the illustrative embodiments described herein are not exhaustive and embodiments or implementations other than those which are described herein and which fall within the scope of the appended claims are possible. Furthermore, there is no intention to be bound by any expressed or implied theory presented in the preceding technical field, background, brief summary or the following detailed description. As used herein, relative terms such as "upper" and "lower" are intended to be used in an illustrative and not a limiting sense. In some applications, therefore, those elements which are identified as "upper" may be located beneath those elements which are identified as "lower" in the following detailed description. For purposes of description herein, such relative terms relate to the position of the progressive shear assembly as illustrated in FIG. 1.

Figure 11:
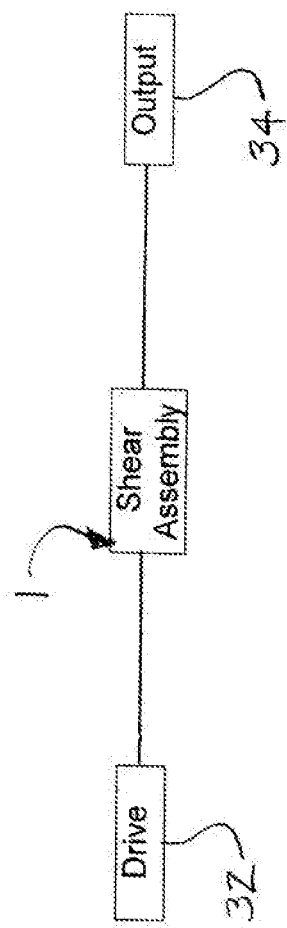
FIG. 11 is a block diagram which illustrates general application of the progressive shear assemblies.

Referring initially to FIG. 11 of the drawings, an illustrative embodiment of the progressive shear assemblies is generally indicated by reference numeral 1. The progressive shear assembly 1 is suitably adapted for coupling a drive 32 to an output 34. In some applications, the drive 32 may include an outboard boat motor (not illustrated) and the output 34 may include a marine propeller 20 (FIG. 1). However, it will be recognized and understood that the progressive shear assembly 1 may alternatively be used to couple the drive 32 to the output 34 in any rotary motion torque transmission application in which it is desired to achieve a selected resilience and torsional resistance of the output 34 relative to the drive 32 and is not limited to marine propeller applications.

Referring next to FIGS. 1-10 of the drawings, in some applications, the progressive shear assembly 1 may drivingly couple a propeller drive shaft 24, typically provided with drive shaft splines 25 and drivingly engaged by an outboard boat motor (not illustrated), and a marine propeller 20, having propeller blades 21 extending from a propeller hub 22. As hereinafter described, the progressive shear assembly 1 may provide a selected torsional and longitudinal resistance between the propeller drive shaft 24 and the propeller hub 22 while imparting a selected resilience and progressive deformation and shear capability between those components to prevent or minimize damage to the propeller drive system during power surges and loads and in the event that one of the propeller blades 21 of the rotating propeller inadvertently strikes a submerged object (not illustrated). The progressive shear assembly 1 may additionally form a tensile spring 40 (FIG. 3) which eliminates or reduces deadband or "play" between the propeller 20 and the propeller drive shaft 24 upon termination of torque applied to the propeller drive shaft 24 and drive adaptor 2.

The progressive shear assembly 1 may include a drive adaptor 2. The drive adaptor 2 may include an adaptor base 3. An elongated adaptor shaft 4 may extend from the adaptor base 3. An adaptor cap 7 may terminate the adaptor shaft 4. The adaptor shaft 4 of the drive adaptor 2 may have an aft shaft end 5 at the adaptor base 3 and a fore shaft end 6 at the adaptor cap 7. A cap plate 8 may extend circumferentially outwardly from the adaptor shaft 4 at the fore shaft end 6. As illustrated in FIGS. 4-8, the adaptor shaft 4 may gradually taper or narrow from the aft shaft end 5 to the fore shaft end 6 for purposes which will be hereinafter described.

Figure 3:
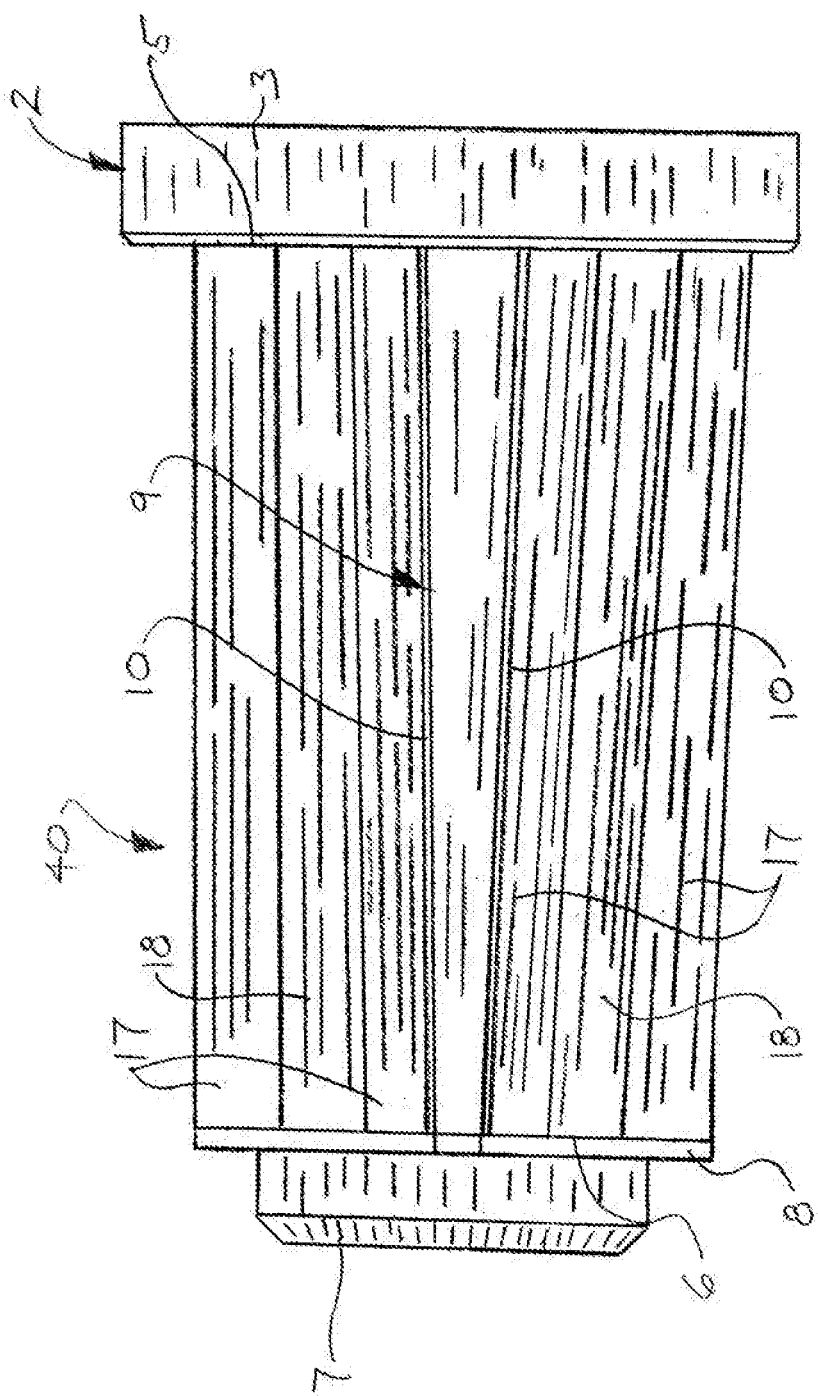
FIG. 3 is a side view of an illustrative drive adaptor of the illustrative progressive shear assembly, with multiple shear members and compression members deployed in place and forming a tensile spring on the drive adaptor in typical assembly of the progressive shear assembly.
Figure 4:
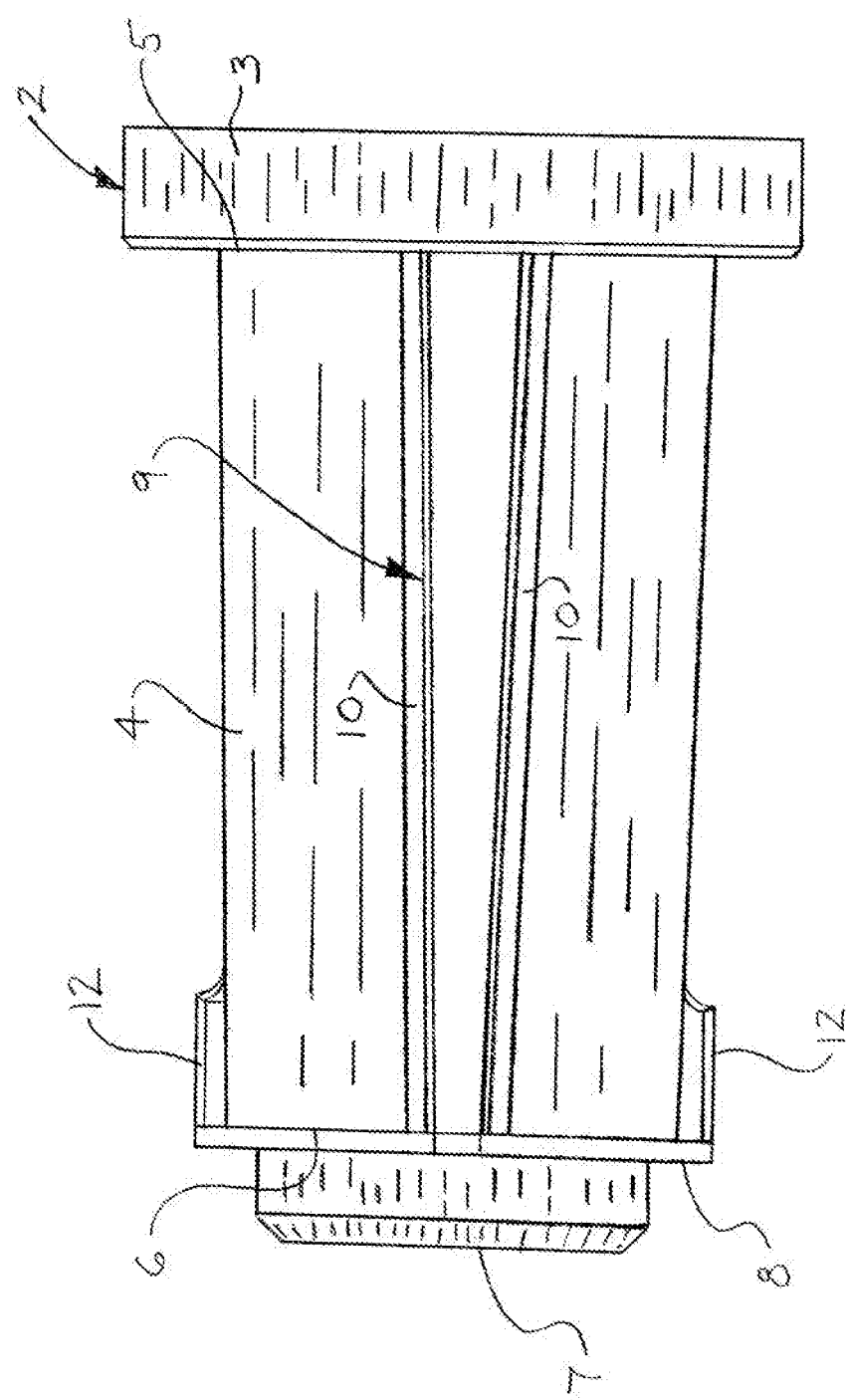
FIG. 4 is a side view of the illustrative drive adaptor illustrated in FIG. 3, with the shear members and compression members removed therefrom.
Figure 10:
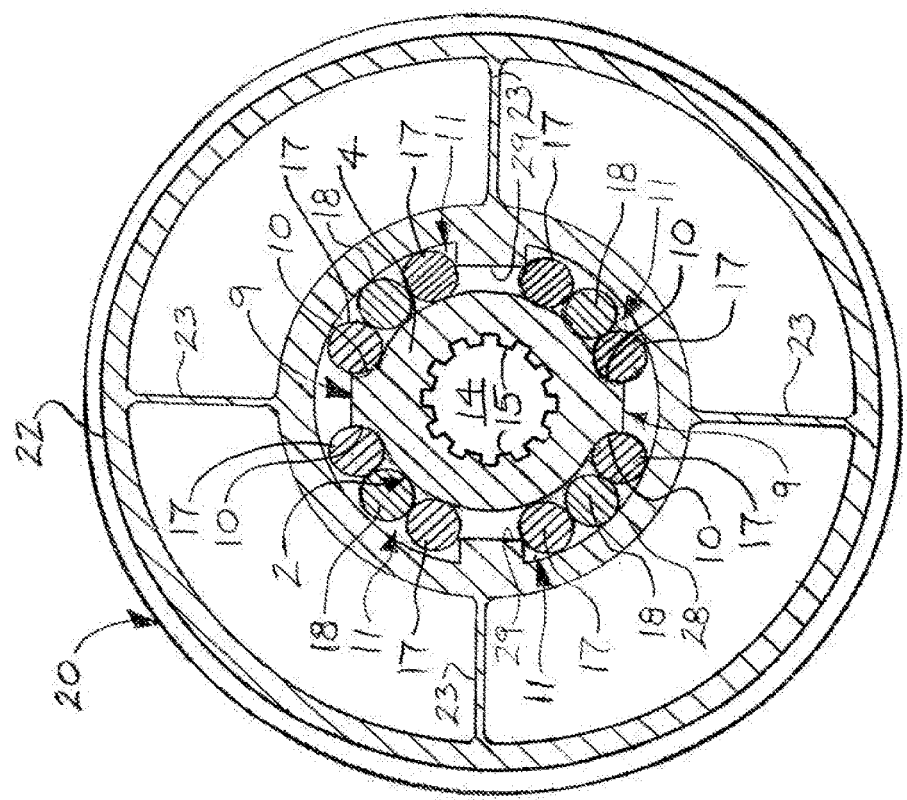
FIG. 10 is a cross-sectional view, taken along section lines 10-10 in FIG. 9, of the propeller hub and progressive shear assembly.
Figure 9:
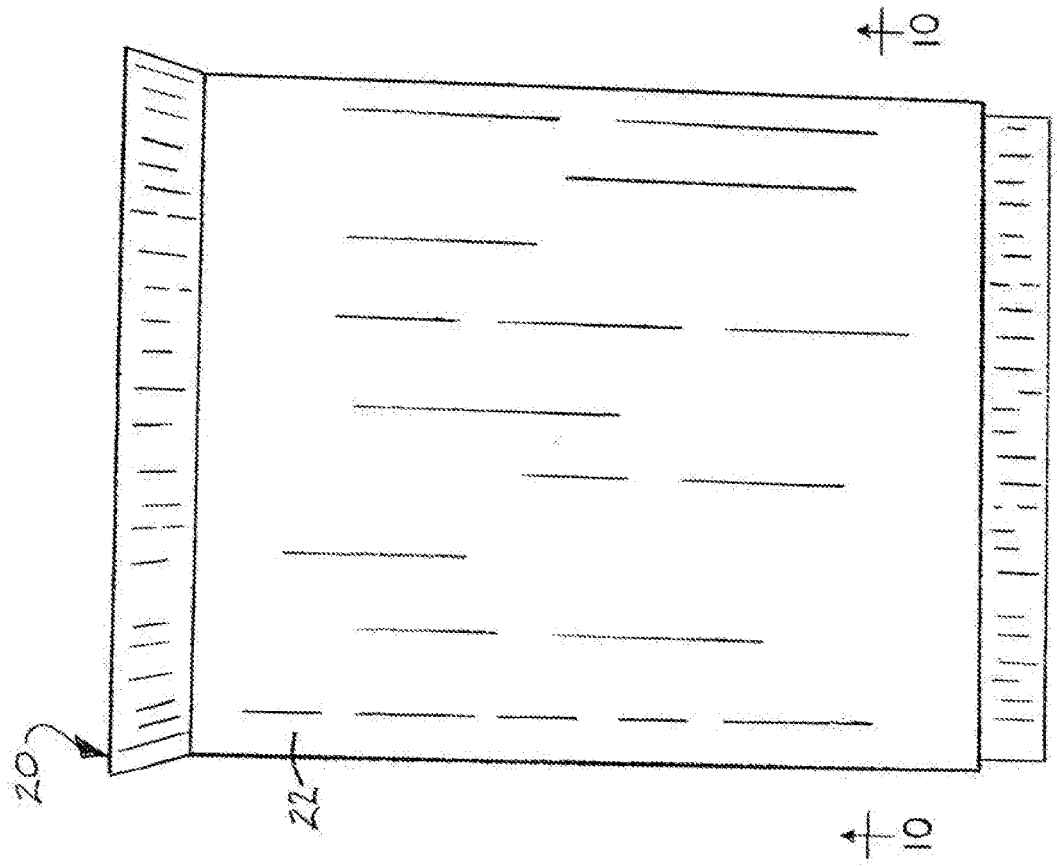
FIG. 9 is a side view of a propeller hub of a typical marine propeller, with the progressive shear assembly (not illustrated) installed in the propeller hub in typical application of the progressive shear assembly.

At least one adaptor lug 9 may extend outwardly from the adaptor shaft 4 of the drive adaptor 2. As illustrated in FIG. 10, in some embodiments, a pair of spaced-apart adaptor lugs 9 may extend from the adaptor shaft 4 on opposite sides of the drive adaptor 2. The adaptor lugs 9 may be oriented in 180-degree relationship to each other on opposite sides of the adaptor shaft 4. As illustrated in FIGS. 3 and 4, each adaptor lug 9 may extend from the aft shaft end 5 to the fore shaft end 6 of the adaptor shaft 4. Each adaptor lug 9 may have a substantially non-uniform width from the aft shaft end 5 to the fore shaft end 6. For example and without limitation, in some embodiments, each adaptor lug 9 may be wedge-shaped, gradually tapering or narrowing from the aft shaft end 5 to the fore shaft end 6, as illustrated. Accordingly, each adaptor lug 9 may have a pair of opposite tapered adaptor lug surfaces 10 which gradually taper toward each other from the aft shaft end 5 to the fore shaft end 6 of the adaptor shaft 4. At least one installation alignment lug 12 may protrude from the adaptor shaft 4, typically adjacent to the cap plate 8, for purposes which will be hereinafter described.

As illustrated in FIGS. 5 and 6, an adaptor bore 14 may traverse the adaptor base 3, the adaptor shaft 4 and the adaptor cap 7 of the drive adaptor 2. As illustrated in FIG. 10, adaptor drive splines 15 may protrude into the adaptor bore 14 along at least a portion of the length of the adaptor bore 14.

As illustrated in FIGS. 3 and 10, in assembly of the progressive shear assembly 1, which will be hereinafter described, multiple incompressible shear members 17 and/or elastomeric or compressible compression members 18 may extend along the adaptor shaft 4 between the adaptor base 3 and the cap plate 8 of the drive adaptor 2. The shear members 17 may include a substantially non-elastomeric and incompressible material such as plastic, metal, wood, composite material or any combination thereof. The compression members 18 may include an elastomeric or compressible material such as rubber, plastic and/or composite material, for example and without limitation. The typical wedge shape of each adaptor lug 9 may pre-load the shear members 17 and the compression members 18 in conical compression, forming the tensile spring 40 (FIG. 3) as the drive adaptor 2 is installed in place in the marine propeller 20, as will be hereinafter described. Pre-loading of the shear members 17 and compression members 18 in compression may enhance control over the torsional resilience between the marine propeller 20 and the propeller drive shaft 24 for various applications of the marine propeller 20, and may eliminate or reduce deadband or "play" between the propeller 20 and the propeller drive shaft 24 upon termination of torque applied to the propeller drive shaft 24 and drive adaptor 2. The shear members 17 may be smaller in diameter or width than the compression members 18 to facilitate conical compression of the shear members 17 and the compression members 18 on the drive adaptor 2. Additionally, the length of the shear members 17 and compression members 18 may be chosen such that the shear members 17 and compression members 18 are compressed between the adaptor base 3 and the cap plate 8 of the drive adaptor 2, thus providing a tighter or more rigid fit of the shear members 17 and compression members 18 on the drive adaptor 2. This expedient may provide additional torsional resistance of the propeller drive shaft 24 with respect to the propeller 20.

Referring next to FIGS. 1, 2, 9 and 10 of the drawings, in typical application, the progressive shear assembly 1 may drivingly couple a marine propeller 20 to a propeller drive shaft 24. The marine propeller 20 may have a conventional design with a propeller hub 22, multiple propeller blades 21 extending from the propeller hub 22 and a propeller hub drive sleeve 28 (FIG. 10) disposed inside and drivingly engaging the propeller hub 22. Multiple hub vanes 23 may connect the propeller hub drive sleeve 28 to the propeller hub 22. At least one propeller torque transfer lug 29 may protrude from an interior surface of the propeller hub drive sleeve 28 along at least a portion of the length of the propeller hub 22. As further illustrated in FIG. 10, in some applications, a pair of propeller torque transfer lugs 29 may protrude from the interior surface of the propeller hub drive sleeve 28 in diametrically-opposed relationship to each other. In some embodiments, the propeller hub drive sleeve 28 and/or the propeller torque transfer lugs 29 may be wedge-shaped and may gradually narrow or taper from the aft end to the fore end of the propeller hub 22.

In typical assembly of the progressive shear assembly 1, the shear members 17 and/or compression members 18 may initially be deployed in place between the adaptor base 3 and the cap plate 8 of the drive adaptor 2 around the circumference of the adaptor shaft 4, as illustrated in FIG. 3. The adaptor bore 14 of the drive adaptor 2 may receive the propeller drive shaft 24, with the drive shaft splines 25 thereof engaging the adaptor drive splines 15 (FIG. 10) of the drive adaptor 2. As illustrated in FIG. 10, the adaptor shaft 4 of the drive adaptor 2 may be inserted into the propeller hub drive sleeve 28 of the propeller hub 22 with the adaptor lugs 9 on the adaptor shaft 4 typically oriented in 90-degree relationship to the propeller torque transfer lugs 29 on the propeller hub drive sleeve 28. The installation alignment lug or lugs 12 may facilitate proper alignment of the adaptor shaft 4 with respect to the propeller hub drive sleeve 28 during insertion. Accordingly, the shear members 17 and/or compression members 18 may be interposed between the arcuate outside surface of the adaptor shaft 4 and the arcuate inside surface of the propeller hub drive sleeve wall 28 of the propeller hub 22, as well as between the adjacent adaptor lugs 9 of the drive adaptor 2 and the interfacing adjacent propeller torque transfer lugs 29 of the propeller hub drive sleeve 28. As the drive adaptor 2 is installed in place in the propeller hub drive sleeve 28, the wedge shape of each adaptor lug 9 may pre-load the shear members 17 and/or compression members 18 in conical compression between the adaptor lugs 9 and the propeller torque transfer lugs 29. Thus, the conically-compressed shear members 17 and/or compression members 18 may form the tensile spring 40 which, upon termination of torque applied to the propeller drive shaft 24 and drive adaptor 2, may eliminate or reduce deadband or "play" between the propeller 20 and the propeller drive shaft 24.

As further illustrated in FIG. 10, at least one member cavity 11 may be formed by and between the exterior surface of the adaptor shaft 4, the interior surface of the propeller hub drive sleeve 28 and each adaptor lug 9 and adjacent propeller torque transfer lug 29. In some embodiments, four member cavities 11 may be formed between the device adaptor 2 and the propeller hub drive sleeve 28 in spaced-apart relationship to each other around the circumference of the adaptor shaft 4. In some embodiments, a pair of shear members 17 and a compression member 18, sandwiched between the shear members 17, may be disposed in each member cavity 11. The typical wedge shape of each adaptor lug 9 may maintain the shear members 17 and compression member 18 in conical compression as they remain in place in the corresponding member cavity 11. The resulting tensile spring 40 may increase the rotational spring back of the shear members 17 and the compression member 18 to eliminate or reduce deadband or "play" between the propeller 20 and the propeller drive shaft 24 in the released or non-powered state of the drive shaft 24. In some embodiments, the propeller hub drive sleeve 28 and/or the propeller torque transfer lugs 29 may taper or narrow from the aft end to the fore end of the propeller hub 22 to additionally increase the rotational spring back of the shear members 17 and compression member 18 and eliminate or reduce the deadband. Additionally, the length of the shear members 17 and/or compression members 18 can be chosen such that the shear members 17 and/or compression members 18 are conically compressed between the adaptor base 3 and the cap plate 8 of the drive adaptor 2. This may provide additional torsional resistance of the propeller drive shall 24 with respect to the marine propeller 20.

In the illustrative embodiment illustrated in FIG. 10, a compression member 18 may be interposed between a pair of shear members 17 in each member cavity 11 to achieve a torsional resistance and resilience which are a function of the combined resilience of the shear members 17 and the compression member 18. It is understood that three of the shear members 17, three of the compression members 18 or any combination of the shear members 17 and compression members 18 can be included in any or each of the member cavities 11, depending upon the desired resilience and torsional resistance characteristics of the propeller 20 with respect to the propeller drive shaft 24. For example and without limitation, in applications in which a constant or variable, considerably high torque load is applied to the progressive shear assembly 1 as occurs, for example, in start-up loads in high-speed boat racing, three shear members 17 may be provided in each member cavity 11. For lower torque load applications, the shear members 17 can be used in combination and in selected sequences with the compression members 18, with the compression member 18 interposed between a flanking pair of shear members 17, as illustrated, or the shear members 17 adjacent to each other with the compression members 18 adjacent to one of the shear members 17. Under circumstances in which the progressive shear assembly 1 undergoes minimal torque loading during application, a typical set of three compression members 18 or a pair of compression members 18 in combination with a shear member 17 in any selected sequence can be included in each member cavity 11. Finally, when little or no shearing is desired in the event that one or more of the propeller blades 21 strikes an underwater object, the shear members 17, typically constructed of brass or aluminum, may be included in each member cavity 11.

Referring again to FIGS. 1, 9 and 10 of the drawings, in typical operation of the progressive shear assembly 1, as the rotating propeller drive shaft 24 applies a torque load to the drive adaptor 2, the adaptor shaft 4 of the drive adaptor 2 may rotate in the clockwise direction in FIG. 10. Accordingly, each adaptor lug 9 of the drive adaptor 2 may apply pressure against the adjacent shear member 17, which may in turn apply pressure against the intervening compression member 18, and the intervening compression member 18, in turn, may apply pressure against the shear member 17 which engages the adjacent propeller torque transfer lug 29 of the propeller hub drive sleeve 28. Consequently, the shear members 17 and compression member 18 may be progressively compressed between each adaptor lug 9 of the drive adaptor 2 and the adjacent propeller torque transfer lug 29 of the propeller hub drive sleeve 28. The shear members 17 and compression members 18 may collectively transmit torsion from the adaptor lugs 9 to the propeller torque transfer lugs 29 to rotate the propeller 20.

In the event of sudden gear changes or power surges at start-up, or if one or more of the propeller blades 21 strikes an underwater obstacle (not illustrated), rotation of the propeller hub 22 may suddenly slow or stop as the adaptor shaft 4 of the drive adaptor 2 may continue to be rotated by the propeller drive shaft 24. Consequently, rotation of the propeller torque transfer lugs 29 on the propeller hub drive sleeve 28 may substantially slow down or stop as the adaptor lugs 9 on the adaptor shaft 4 continue clockwise rotation with the drive adaptor 2, and the shear members 17 and compression members 18 may be progressively sheared as the compressive torque load generated between the slow or stationary propeller torque transfer lugs 29 and the rotating adaptor lugs 9 increases. Accordingly, the shear member 17 adjacent to the corresponding impinging adaptor lug 9 typically shears first, followed by the sandwiched compression member 18 and finally, the shear member 17 adjacent to the corresponding propeller torque transfer lug 29 of the propeller hub drive sleeve 28, any or all of which shear members 17 and compression members 18 may or may not shear, depending upon the magnitude of the torque load or shock between the drive adaptor 2 and the motor drive shaft 24 and whether the propeller 20 disengages the submerged obstacle. Typically, at least one shear member 17 in each member cavity 11 remains un-sheared, to provide continued driving engagement of the propeller drive shaft 24 with the propeller 20 and facilitate sustained rotation and driving operation of the submerged propeller 20 in the water. The sheared or damaged shear members 17 and/or compression members 18 can be easily replaced by removing the adaptor shaft 4 of the drive adaptor 2 from the propeller hub drive sleeve 28, removing the sheared or damaged shear members 17 and/or compression members 18 from the drive adaptor 2, positioning replacement shear members 17 and/or compression members 18 in the drive adaptor 2, and re-inserting the adaptor shaft 4 of the drive adaptor 2 in the propeller hub drive sleeve 28, thereby progressively pre-loading the replacement shear members 17 and/or compression members 18 in conical compression. Upon release of torque applied to the propeller drive shaft 24 and drive adaptor 2, the tensile spring 40 formed by the increased rotational spring back of the conically-compressed shear members 17 and/or compression members 18 may eliminate or reduce deadband or "play" between the propeller 20 and the propeller drive shaft 24.

It will be appreciated by those skilled in the art that the progressive shear assembly 1 can be constructed using plastic, rubber, metal, wooden, composite material and/or other shear members 17 and compression members 18 of any selected resilience, porosity or hardness, cross-sectional configuration and length, to achieve a selected resilience and torsional, as well as longitudinal resistance between the propeller drive shaft 24 and the propeller 20. It is understood that the shear members 17 and compression members 18 can be constructed in any desired cross-sectional shape, including polygonal, and the resilience and torsional resistance can further be modified, as desired, by varying the length and wall thickness of tubular shear members and compression members, with greater lengths increasing the torsional and longitudinal resistance and decreasing the resilience, and smaller lengths decreasing the torsional and longitudinal resistance and increasing the resilience. Referring again to FIG. 10, it will be further appreciated by those skilled in the art that any desired number of the shear members 17 and/or compression members 18 of selected resilience and composition can be provided between the adaptor shaft 4 and the propeller hug drive sleeve 28 to achieve the desired torsional resistance and resilience. While rubber compression members 18 can be any selected hardness, typical hardness for the rubber compression members 18 is in the range 80-90 duro rubber. In some embodiments, the rubber compression members 18 may also be hollow and filled with a compressed gas such as air to vary the resistance to shear.

It will be appreciated by those skilled in the art that the resilience and torsional resistance between the propeller 20 and the propeller drive shaft 24 can be varied by maintaining a squared-off configuration on the respective longitudinal edges of each adaptor lug 9, as illustrated in FIG. 10, in which case each adaptor lug 9 applies a point load to the outer shear members 17 in each member cavity 11, or by rounding off and matching the lateral edges of each adaptor lug 9 with the curvature of the outer shear members 17 in each member cavity 11. The torsional resistance can be further modified by varying the extent of overlap of the adaptor lugs 9 of the drive adaptor 2 with respect to the diameter of the shear members 17. For example, the adaptor lugs 9 illustrated in FIG. 10 extend about halfway along the diameter, or co-extensive with the radius, of the shear members 17. By extending the length of the adaptor lugs 9 radially outwardly from the adaptor shaft 4 to overlap the shear members 17 at a point greater than the radius of each, a greater portion of the shear members 17 may be compressed directly between the adaptor lugs 9 of the drive adaptor 2 and the propeller torque transfer lugs 29 of the propeller hub drive sleeve 28. Consequently, the torsional resistance will increase and the resiliency will decrease between the propeller 20 and the propeller drive shaft 24.

It will be appreciated by those skilled in the art that the typically wedge-shaped configuration of the adaptor shaft 4 and the adaptor lugs 9 of the drive adaptor 2 pre-load the shear members 17 and/or the compression members 18 into conical compression as the drive adaptor 2 is inserted into the propeller hub drive sleeve 28 of the marine propeller 20 in assembly of the progressive shear assembly 1. In some embodiments, the propeller hub drive sleeve 28 and/or the propeller torque transfer lugs 29 may additionally be tapered or wedged from the fore end to the aft end of the propeller 20 to additionally pre-load the shear members 17 and/or the compression members 18 into conical compression. The compressed shear members 17 and/or compression members 18 in the tensile spring 40 may increase the rotational spring back of the shear members 17 and the compression member 18 to eliminate or reduce deadband or "play" between the propeller 20 and the propeller drive shaft 24. This may result in a tighter coupling between the propeller 20 and the propeller drive shaft 24, resulting in a more efficient drive from the propeller drive shaft 24 to the propeller 20.

Figure 13:
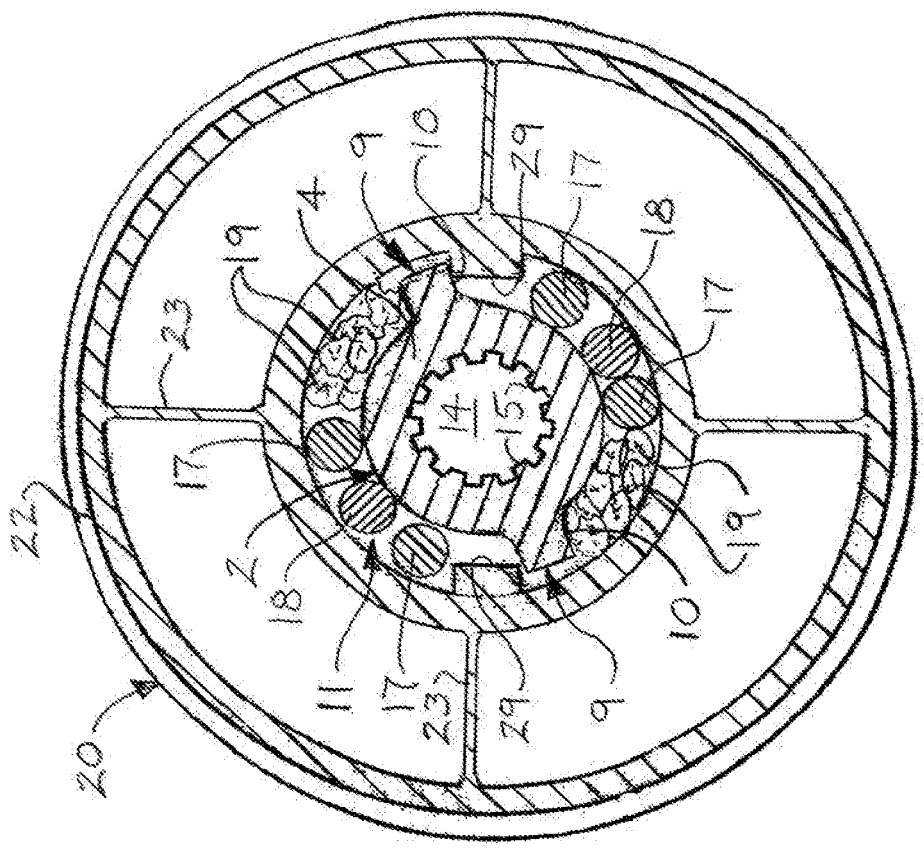
FIG. 13 is a cross-sectional view, taken along section lines 10-10 in FIG. 9, of the alternative illustrative embodiment of the propeller hub and progressive shear assembly illustrated in FIG. 12, with some of the shear members and compression members in a sheared state and the adaptor lugs on the device adaptor engaging a respective pair of propeller torque transfer lugs on the propeller hub drive sleeve of the marine propeller.
Figure 12:
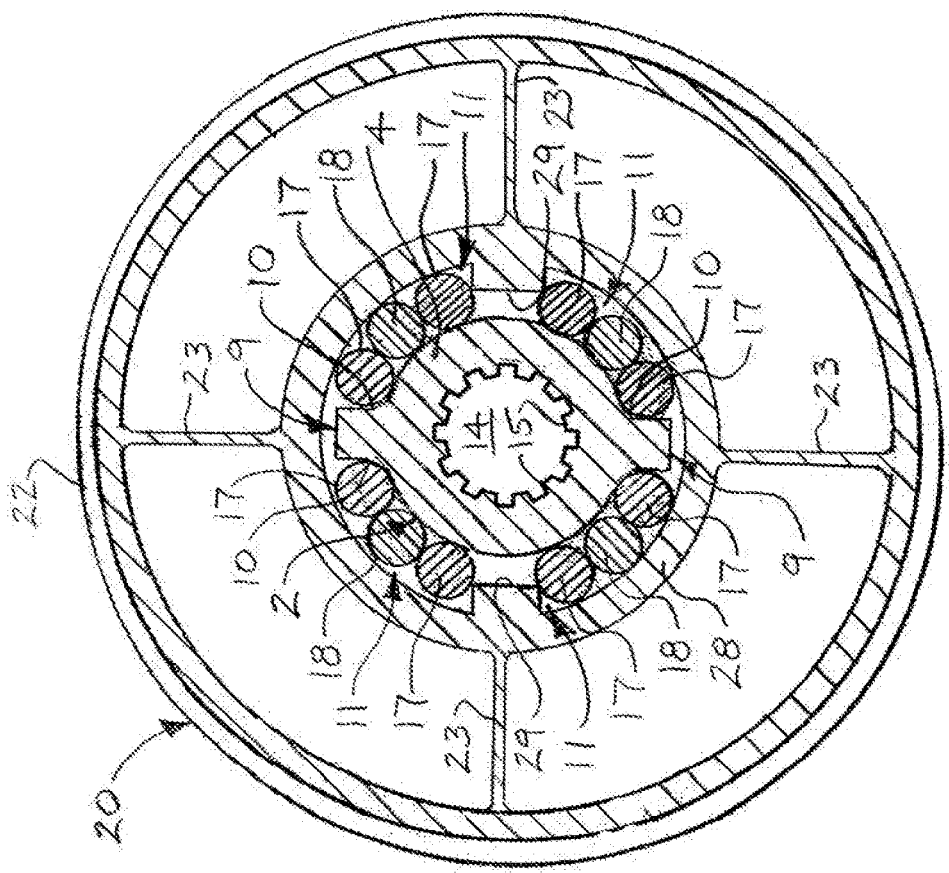
FIG. 12 is a cross-sectional view, taken along section lines 10-10 in FIG. 9, of an alternative illustrative embodiment of the propeller hub and progressive shear assembly.

Referring next to FIGS. 12 and 13 of the drawings, in some embodiments of the progressive shear assembly 1, each adaptor lug 9 on the drive adaptor 2 may extend greater than halfway of the distance or spacing between the exterior surface of the adaptor shaft 4 and the interior surface of the propeller hub drive sleeve 28. Accordingly, in the event that the shear members 17 and/or compression members 18 in a member cavity 11 are sheared, forming sheared members 19, each adaptor lug 9 may engage the corresponding adjacent propeller torque transfer lug 29. Continued rotation of the propeller drive shaft 24 and drive adaptor 2 thus transmits torque to the propeller hub drive sleeve 28 of the propeller hub 22 through the adaptor lugs 9 and propeller torque transfer lugs 29. This expedient ensures 90-degrees of shock absorption as each adaptor lug 9 traverses the member cavity 11, shearing the shear members 17 and/or compression members 18 and engaging the corresponding propeller torque transfer lug 29. Furthermore, transmission of torque from the propeller drive shaft 24 to the marine propeller 20 can continue in the event that all of the shear members 17 and/or compression members 18 in two or more of the member cavities 11 is sheared.

Figure 14:
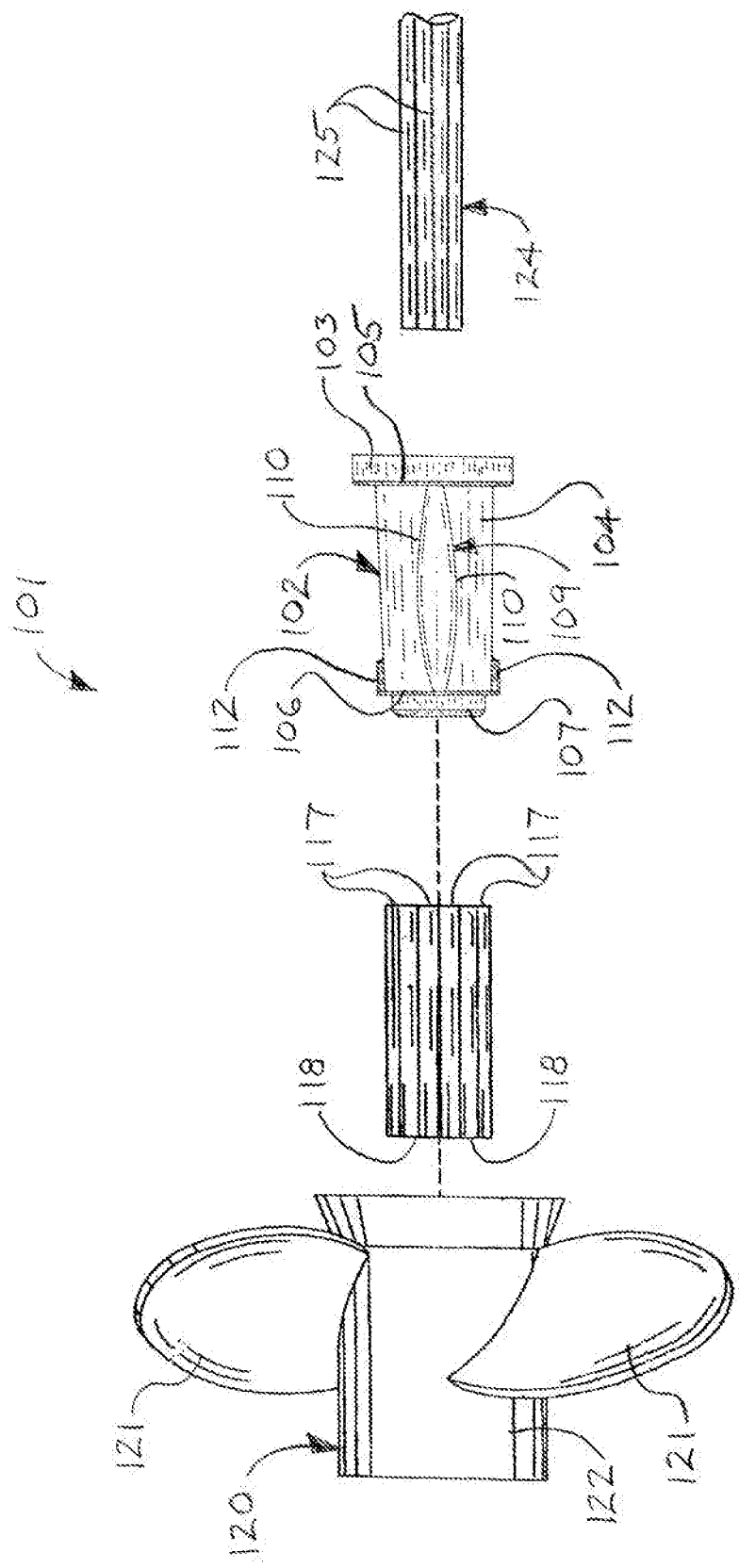
FIG. 14 is an exploded side view of another alternative illustrative embodiment of the progressive shear assemblies.
Figure 15:
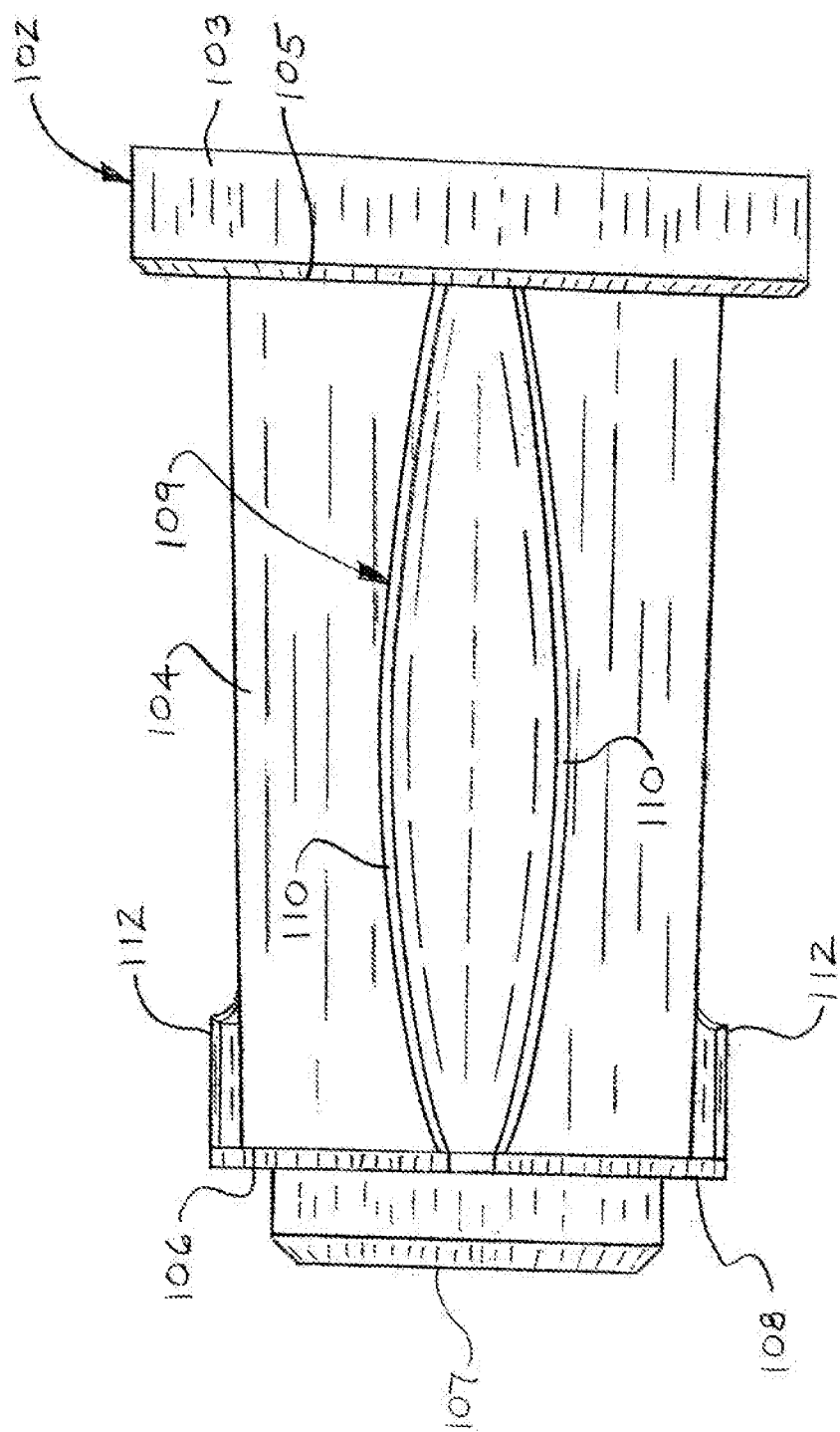
FIG. 15 is a side view of an illustrative drive adaptor of the progressive shear assembly illustrated in FIG. 14, with the shear members and compression members removed therefrom.
Figure 16:
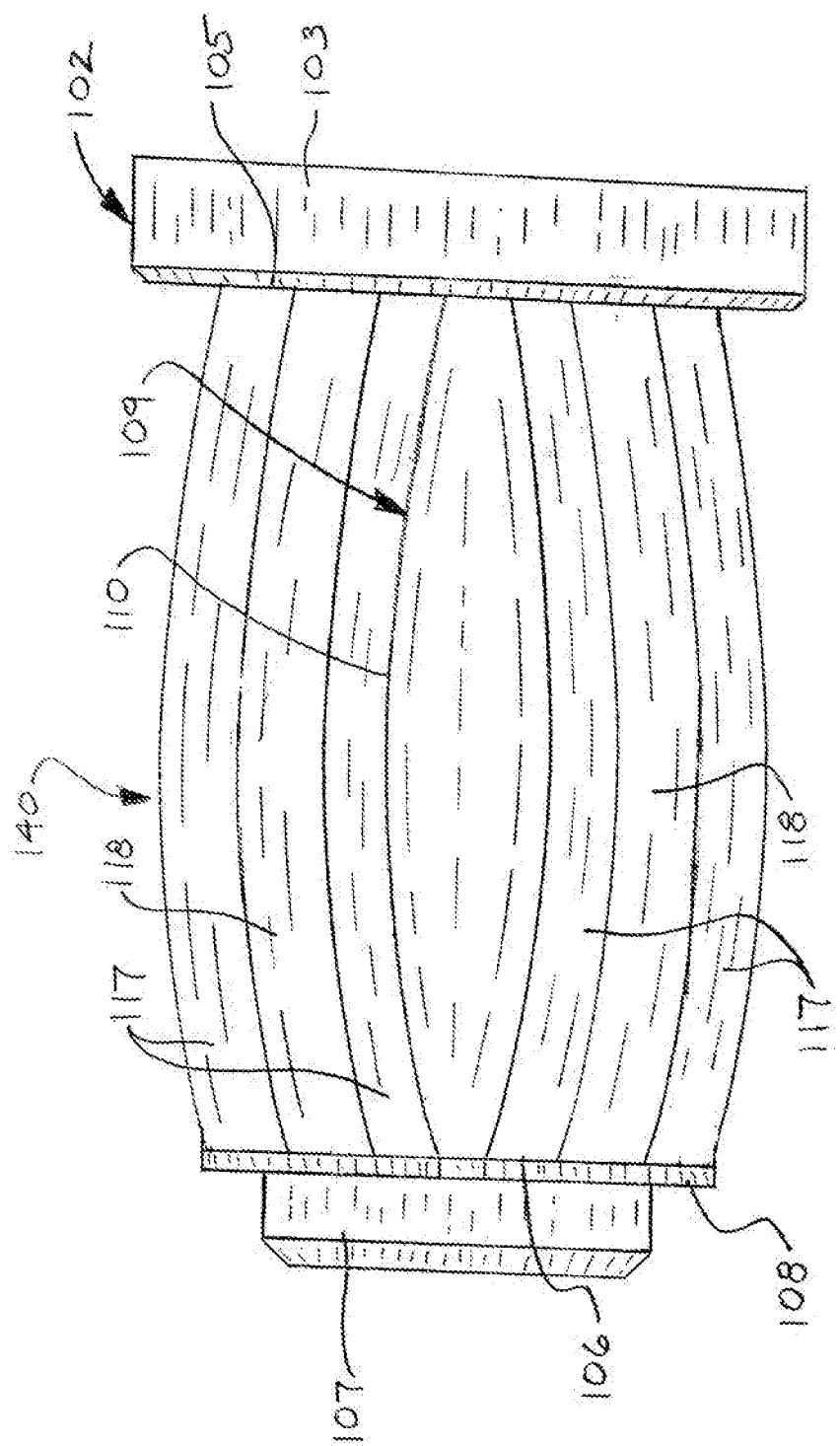
FIG. 16 is a side view of the illustrative drive adaptor of the progressive shear assembly illustrated in FIG. 15, with multiple bowed shear members and compression members deployed in place and forming a tensile spring on the drive adaptor in typical assembly of the progressive shear assembly.
Figure 17:
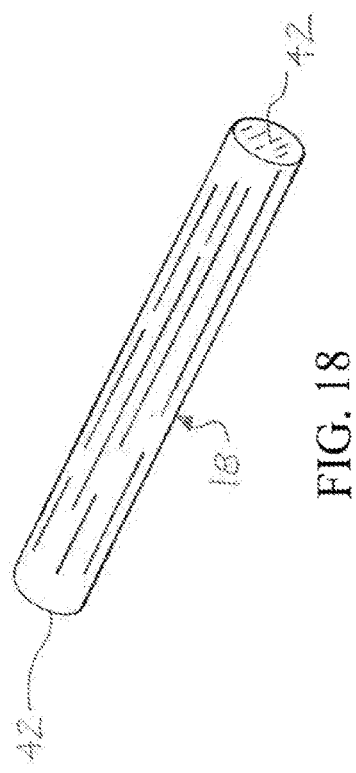
FIGS. 17 and 18 are perspective views, respectively, of a typical compression member suitable for implementation an illustrative embodiment of the progressive shear assemblies.
Figure 18:
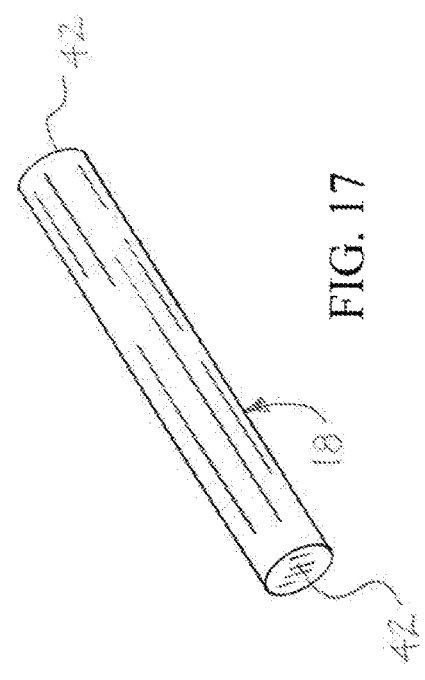
Figure 20:
FIG. 20 is an end view of the compression member illustrated in FIGS. 17 and 18.
Figure 19:
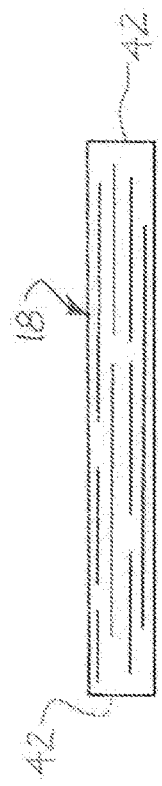
FIG. 19 is a side view of the compression member illustrated in FIGS. 17 and 18.
Figure 21:
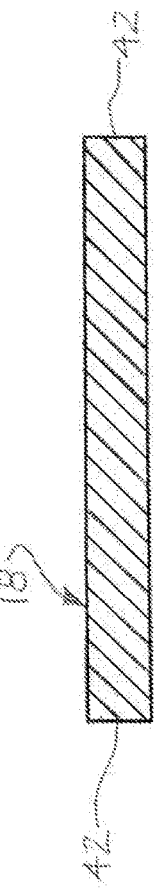
FIG. 21 is a longitudinal sectional view of the compression member illustrated in FIGS. 17 and 18, more particularly illustrating a solid construction of the compression member.

Referring next to FIGS. 14-16 of the drawings, an alternative illustrative embodiment of the progressive shear assemblies is generally indicated by reference numeral 101 in FIG. 14. In the progressive shear assembly 101, elements which are analogous to the respective elements of the progressive shear assembly 1 that was heretofore described with respect to FIGS. 1-11 are designated by the same respective numerals in the 100-199 series in FIGS. 14-16. In the progressive shear assembly 101, the adaptor lugs 109 on the drive adaptor 102 may be elliptical in shape to produce a tensile spring 140 (FIG. 16) in which the torque forces and distorts the shear members 117 and/or compression members 118 to conform to the elliptical shape of the adaptor lugs 109, as illustrated in FIG. 16. As long as their temperature limits are maintained, the shear members 117 and compression members 118 return to their original shape after the torque is removed from the propeller drive shaft 124. This produces a simple and effective rotational spring back effect in a rotary motion torque transmission device which has application including but not limited to drive couplings in marine propeller applications.

Referring next to FIGS. 17-21 of the drawings, a typical construction for each compression member 18 of the progressive shear assembly 1 (FIGS. 1-13) and each compression member 118 of the progressive shear assembly 101 (FIGS. 14-16) is illustrated. Each compression member 18 may have a solid elongated, cylindrical construction with opposite solid compression member ends 42. Each compression member 18 may include an elastomeric or compressible material such as rubber, plastic and/or composite material, for example and without limitation.

Referring next to FIGS. 22-26 of the drawings, a typical construction for each shear member 17 of the progressive shear assembly 1 (FIGS. 1-13) and each shear member 117 of the progressive shear assembly 101 (FIGS. 14-16) is illustrated. Each shear member 17 may have an elongated, cylindrical construction with a shear member wall 44. A shear member bore 45 may traverse the shear member wall 44. Each shear member 17 may include a substantially non-elastomeric and incompressible material such as plastic, metal, wood, composite material or any combination thereof. In some embodiments, the shear member bore 45 may be filled with a compressed gas such as air and the respective ends of the shear member bore 45 closed to seal the gas in the shear member bore 45 to vary the resistance to shear.

Figure 27:
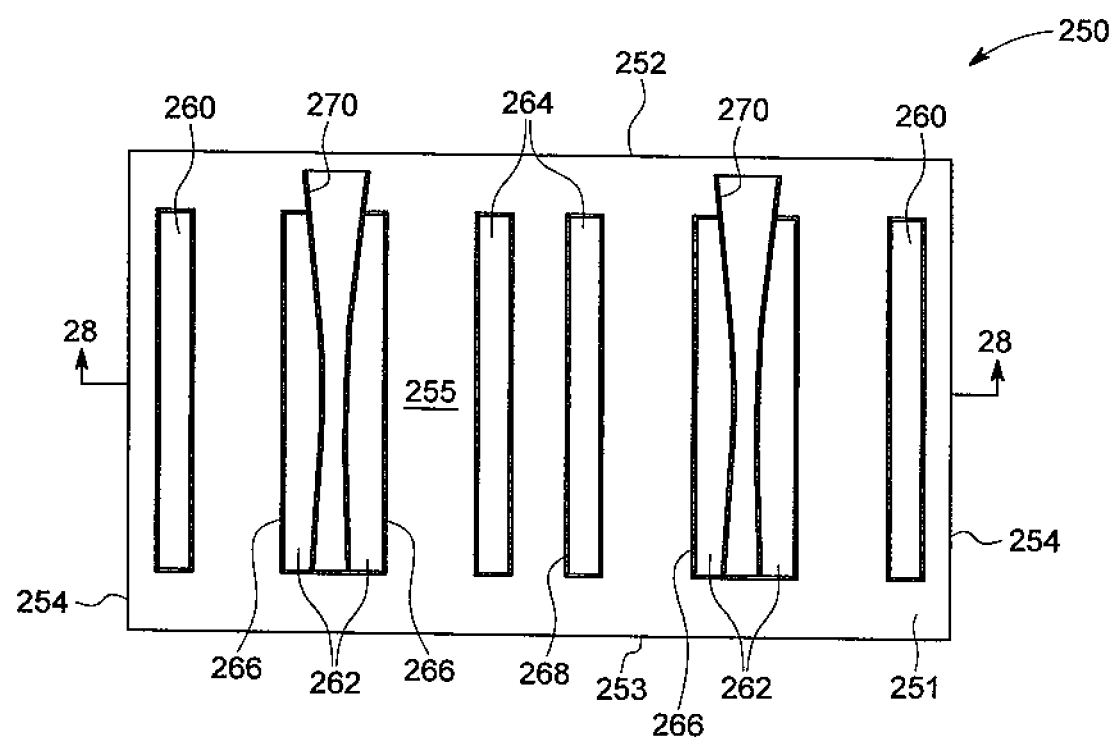
FIG. 27 is a side view of a typical shear assembly sleeve according to an alternative illustrative embodiment of the progressive shear assembly, shown in an extended or flattened configuration.
Figure 28:
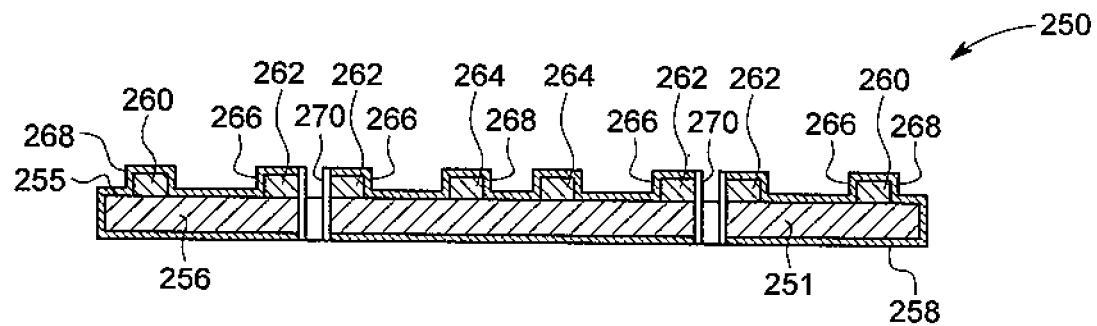
FIG. 28 is a longitudinal sectional view, taken along section lines 28-28 in FIG. 27, of the shear assembly sleeve, more particularly illustrating a typical encased construction for the shear assembly sleeve.
Figure 29:
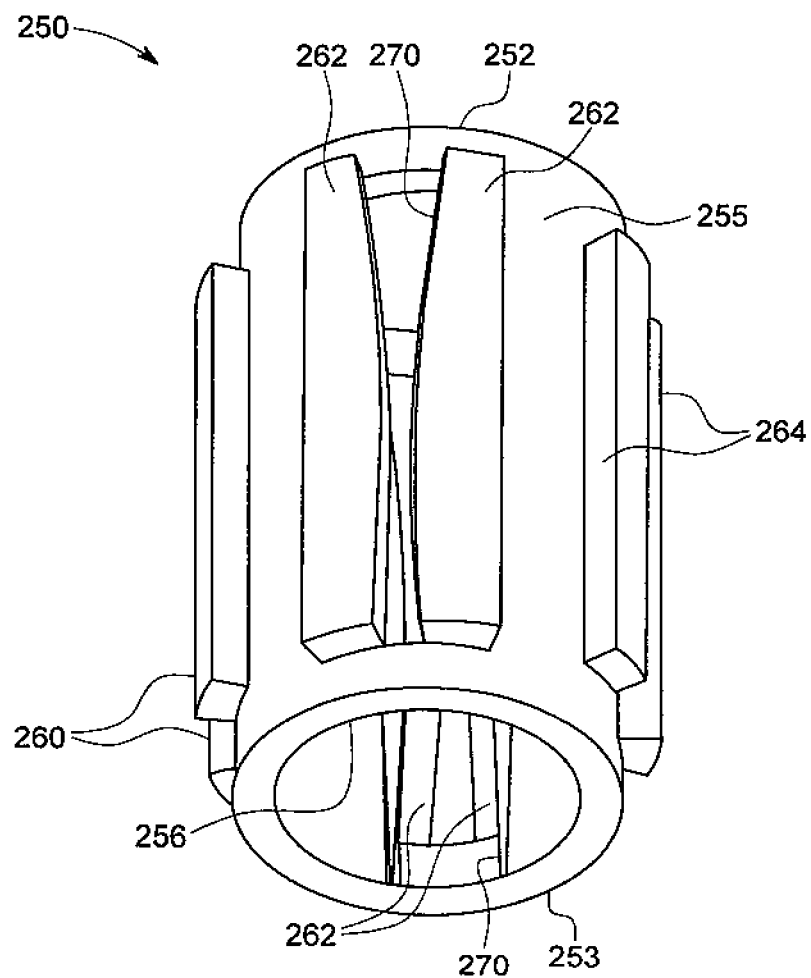
FIG. 29 is a perspective view of the assembly sleeve shown in a functional, rolled configuration.
Figure 30:
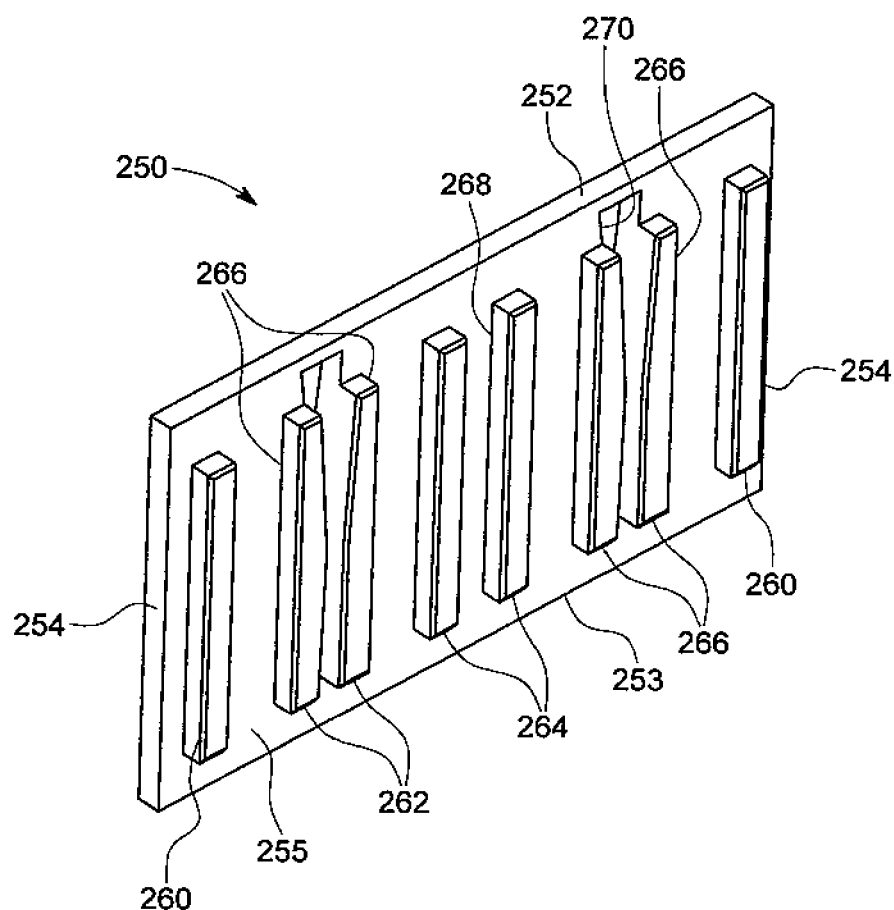
FIG. 30 is a perspective view of the shear assembly sleeve shown in the extended or flattened configuration.
Figure 31:
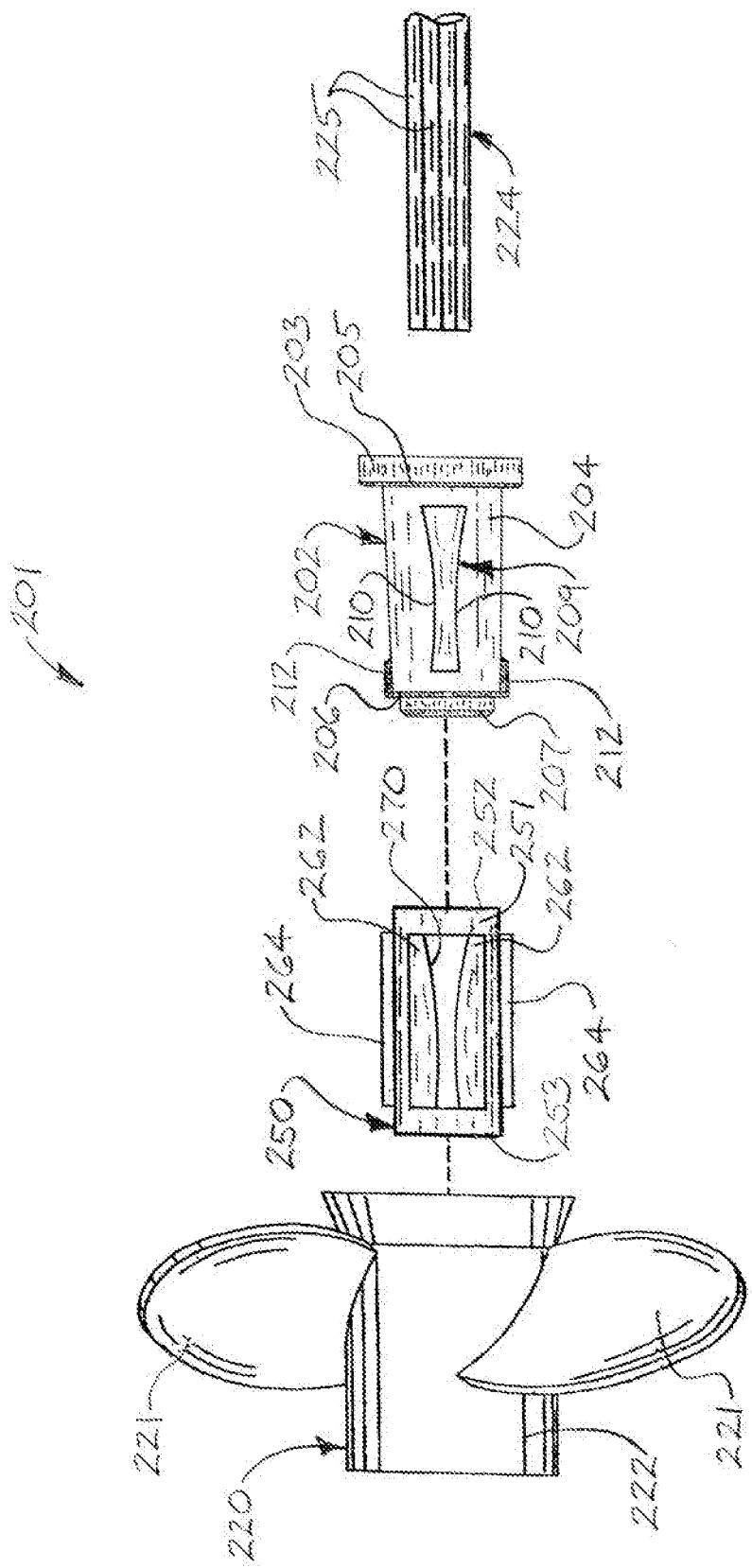
FIG. 31 is an exploded side view of the illustrative progressive shear assembly which includes the shear assembly sleeve illustrated in FIGS. 27-30.
Figure 32:
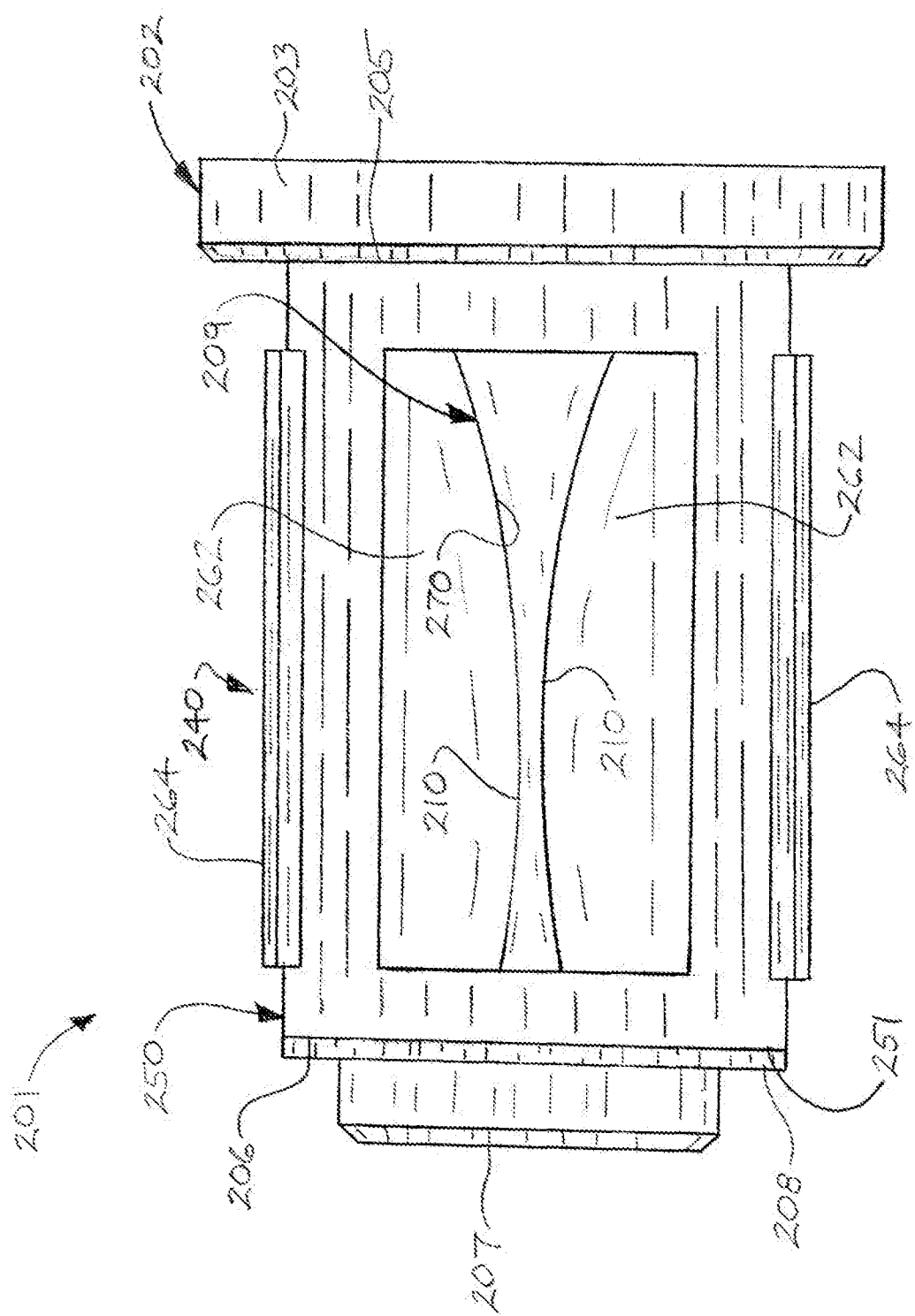
FIG. 32 is a side view of the assembled progressive shear assembly with the shear assembly sleeve deployed in place over the drive adaptor of the assembly.

Referring next to FIGS. 27-34 of the drawings, an alternative illustrative embodiment of the progressive shear assemblies is generally indicated by reference numeral 201 in FIGS. 31 and 32. In the progressive shear assembly 201, elements which are analogous to the respective elements of the progressive shear assembly 1 that was heretofore described with respect to FIGS. 1-11 are designated by the same respective numerals in the 200-299 series in FIGS. 27-34. The assembly 201 may include a shear assembly sleeve 250. The shear assembly sleeve 250 may have a molded elastomeric construction and, as illustrated in FIGS. 27-29, may include a sleeve wall 251. The sleeve wall 251 may be generally elongated and rectangular. As illustrated in FIGS. 27 and 30, the sleeve wall 251 may have a trailing wall edge 252, a leading wall edge 253, side wall edges 254, an outer sleeve surface 255 and an inner sleeve surface 256. The sleeve wall 251 of the shear assembly sleeve 250 may include a resilient, flexible and bendable or rollable elastomeric or compressible material such as rubber, plastic and/or composite material, for example and without limitation.

As illustrated in FIGS. 27 and 28, at least one, and typically, a pair of elongated terminal drive output members 260 may extend across at least a portion of the outer sleeve surface 255 between the trailing wall edge 252 and the leading wall edge 253 of the sleeve wall 251 and in parallel and adjacent relationship to a corresponding side wall edge 254 of the sleeve wall 251. At least one, and typically, a pair of elongated, parallel, spaced-apart inside drive output members 264 may extend across the outer sleeve surface 255 between and parallel to the terminal drive output members 260. At least one, and typically, two pairs of parallel, spaced-apart drive input members 262 may extend across the outer sleeve surface 255 between the trailing wall edge 252 and the leading wall edge 253 of the sleeve wall 251. Each pair of drive input members 262 may be situated between and in parallel, spaced-apart relationship to each corresponding terminal drive output member 260 and inside drive output member 264. As illustrated in FIG. 28, in some embodiments, a flexible, bendable or elastomeric sleeve casing 258 may enclose the sleeve wall 251, the terminal drive output members 260, the drive input members 262 and the inside drive output members 264. The sleeve casing 258 may include the same or different materials as the sleeve wall 251.

A shear space 266 may be formed by and between each terminal drive output member 260 and corresponding drive input member 262 and between each drive input member 262 and corresponding inside drive output member 264. A transfer lug slot 268 may be formed by and between the inside drive output members 264 and by and between the terminal drive output members 260 in the rolled configuration of the shear assembly sleeve 250. A drive slot 270 may be formed by and between each pair of drive input members 262 and may extend through the sleeve wall 251, opening to the inner sleeve surface 256 of the shear assembly sleeve 250.

Each of the terminal drive output members 260, the drive input members 262 and the inside drive output members 264 may include at least one shear member and/or at least one compression member. Depending on the desired resilience and torsional resistance characteristics of the propeller 220 with respect to the propeller drive shaft 224, the shear members and compression members may be arranged in any desired order or sequence as the terminal drive output members 260, the drive input members 262 and the inside drive output members 264. In some embodiments, the terminal drive output members 260, the drive input members 262 and the inside drive output members 264 may utilize compression members having an elastomeric or compressible material such as rubber, plastic and/or composite material, for example and without limitation, alone or in combination with shear members having a substantially non-elastomeric and incompressible material such as plastic, metal, wood, composite material, or any combination thereof alone or in any combination or sequence.

Figure 34:
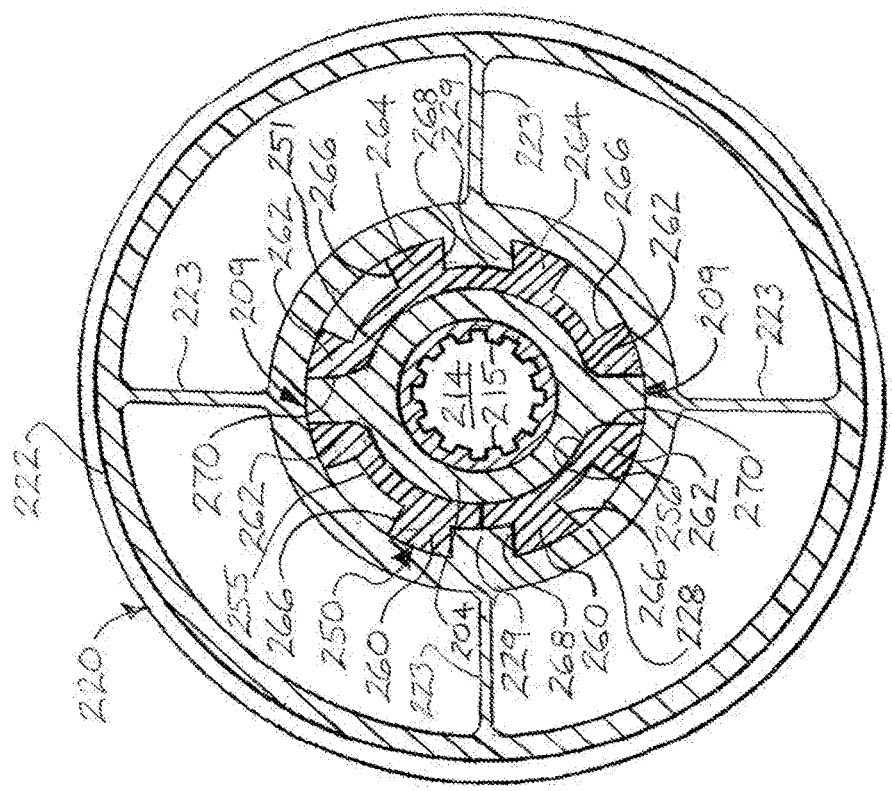
FIG. 34 is a cross-sectional view, taken along section lines 34-34 in FIG. 33, of the propeller hub and progressive shear assembly.
Figure 33:
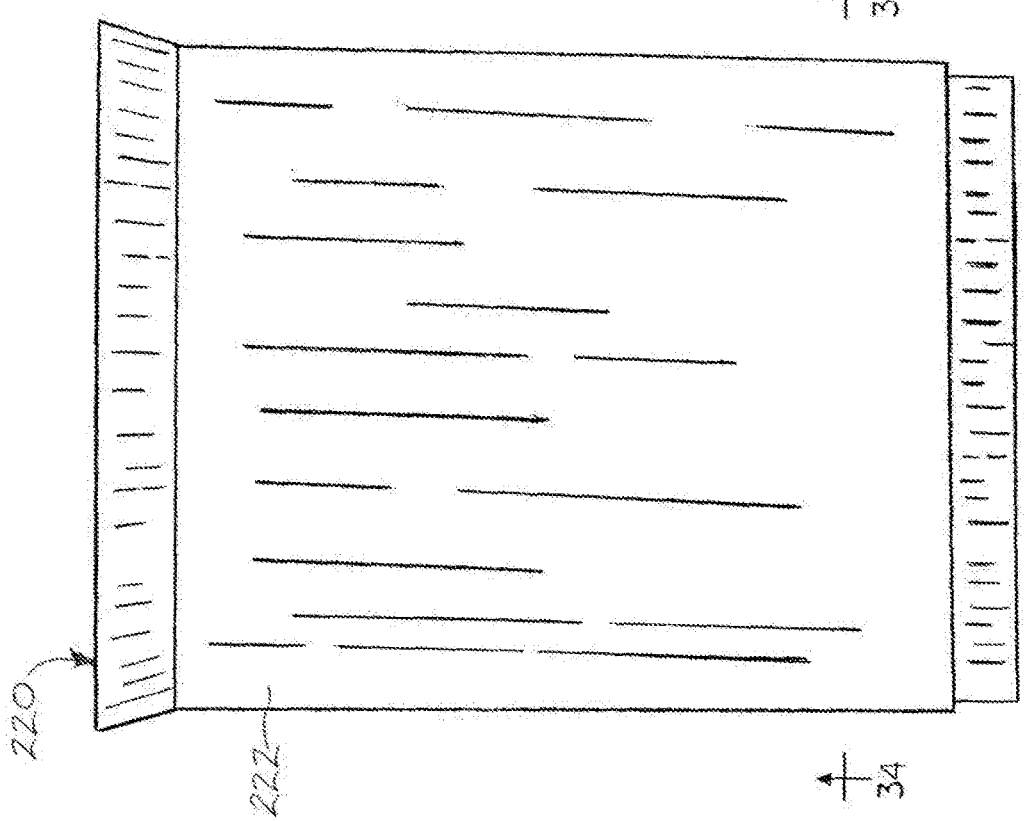
FIG. 33 is side view of a propeller hub of a typical marine propeller, with the progressive shear assembly of FIG. 32 (not illustrated) installed in the propeller hub in typical application of the progressive shear assembly.

As illustrated in FIGS. 31 and 32, in typical assembly of the progressive shear assembly 201, the sleeve wall 251 may be rolled into a tubular shape over the drive adaptor 202 typically by extending the side wall edges 254 into adjacent juxtaposition with respect to each other with the outer sleeve surface 255 facing outwardly away from the adaptor shaft 204 and the inner sleeve surface 256 facing inwardly toward the adaptor shaft 204. As illustrated in FIG. 34, as the shear assembly sleeve 250 is rolled and deployed in place on the drive adaptor 202, the adaptor lugs 209 of the drive adaptor 202 may be inserted through the respective adaptor lug slots 270 which extend through the sleeve wall 251 and between each pair of adjacent drive input members 262. As illustrated in FIG. 32, in some embodiments, each adaptor lug 209 may have a biconcave shape in which each adaptor lug surface 210 has a concave contour or profile. Accordingly, the interior surfaces of the drive slot 270 may have a convex shape to match the concave contour of the respective adaptor lug surfaces 210. In deployment of the shear assembly sleeve 250 on the drive adaptor 202, the adaptor lug surface 210 may progressively pre-load the drive input members 262 in conical compression as the adaptor lug 209 is inserted through the drive slot 270, forming a tensile spring 240 which may eliminate or reduce deadband or "play" between the propeller 220 and the propeller drive shaft 224 upon termination of torque applied to the propeller drive shaft 224 and drive adaptor 202. The sleeve wall 251 may be oriented with the trailing wall edge 252 and the leading wall edge 253 corresponding in position to the respective trailing and leading edges (not numbered) of the marine propeller 220. As further illustrated in FIG. 34, the side wall edges 254 of the sleeve wall 251 may abut each other to form the transfer lug slot 268 between the terminal drive output members 260.

As illustrated in FIGS. 31 and 34, the assembled progressive shear assembly 201 may be deployed in place in the propeller hub drive sleeve 228 of the marine propeller 220. Accordingly, the propeller torque transfer lugs 229 on the propeller hub drive sleeve 228 may insert into the respective transfer lug slots 268 between each corresponding pair of terminal drive output members 260, as further illustrated in FIG. 34. Each shear space 266 may be formed by and between the outer sleeve surface 255 of the sleeve wall 251 and the inner surface of the propeller hub drive sleeve 228 and between each terminal drive output member 260 and corresponding adjacent drive input member 262 of the shear assembly sleeve 250. The propeller hub drive sleeve 228 may maintain the shear assembly sleeve 250 in the functional, rolled configuration as the shear assembly sleeve 250 remains deployed in place in the marine propeller 220.

In typical operation of the progressive shear assembly 201, as the rotating propeller drive shaft 224 applies a torque load to the drive adaptor 202, the adaptor shaft 204 of the drive adaptor 202 may rotate in the clockwise direction in FIG. 34. Accordingly, each adaptor lug 209 of the drive adaptor 202 may apply pressure against an adjacent one of the paired drive input members 262 of the torque assembly sleeve 250. One of the paired terminal drive output members 260 and one of the paired inside drive output members 264, in turn, of the torque assembly sleeve 250 may apply pressure against the corresponding adjacent propeller torque transfer lug 229 of the propeller hub drive sleeve 228. The drive input members 262, terminal drive output member 260 and inside drive output member 264 may thus collectively transmit torsion from the adaptor lugs 209 to the propeller torque transfer lugs 229 to rotate the propeller 220. The same description applies in reverse operation of the marine propeller 220, with the other paired drive input member 262, terminal drive output member 260 and inside drive output member 264 effecting transfer of torque from the drive adaptor 202 to the propeller hub drive sleeve 228 through the adaptor lugs 209 and propeller torque transfer lugs 229.

In the event of sudden gear changes or power surges at start-up, or if one or more of the propeller blades 221 strikes an underwater obstacle (not illustrated), rotation of the propeller hub 222 may suddenly slow or stop as the adaptor shaft 204 of the drive adaptor 202 may continue to be rotated by the propeller drive shaft 224. Consequently, rotation of the propeller torque transfer lugs 229 on the propeller hub drive sleeve 228 may substantially slow down or stop as the adaptor lugs 209 on the adaptor shaft 204 continue clockwise rotation with the drive adaptor 202, and one or more of the drive input member 262, the terminal drive output member 260 and the inside drive output member 264 may be progressively sheared as the compressive torque load generated between the slow or stationary propeller torque transfer lugs 229 and the rotating adaptor lugs 209 increases. As they are sheared, the drive input members 262, the terminal drive output member 260 and the inside drive output member 264 may traverse the corresponding adjacent shear space 266. Typically, at least one of the terminal drive output members 260, the drive input member 262 and the inside drive output member 264 remains un-sheared, to provide continued driving engagement of the propeller drive shaft 224 with the propeller 220 and facilitate sustained rotation and driving operation of the submerged propeller 220 in the water.

The sheared or damaged shear assembly sleeve 250 can be easily replaced by removing the adaptor shaft 204 of the drive adaptor 202 from the propeller hub drive sleeve 228, removing the sheared or damaged sheer assembly sleeve 250 from the drive adaptor 202, positioning a replacement shear assembly sleeve 250 on the drive adaptor 202, and re-inserting the adaptor shaft 204 of the drive adaptor 202 in the propeller hub drive sleeve 228, thereby progressively pre-loading the drive input members 262 in conical compression. Upon release of torque applied to the propeller drive shaft 224 and drive adaptor 202, the tensile spring 240 formed by the increased rotational spring back of the conically-compressed drive input members 262 may eliminate or reduce deadband or "play" between the propeller 220 and the propeller drive shaft 224.

While the preferred embodiments of the invention have been described above, it will be recognized and understood that various modifications may be made in the invention and the appended claims are intended to cover all such modifications which may fall within the spirit and scope of the invention.

What is claimed is:

1. A progressive shear assembly for coupling a drive to an output, comprising:
   a hub for coupling to the output, the hub including:
      a hub drive sleeve; and
      at least one torque transfer lug on the hub drive sleeve; and
   a drive adaptor for coupling to the drive, the drive adaptor including:
      an adaptor shaft disposed in the hub drive sleeve of the hub, the adaptor shaft having an aft shaft end and a fore shaft end and tapering from the aft shaft end to the fore shaft end; and
      at least one adaptor lug on the adaptor shaft, the at least one adaptor lug having a substantially non-uniform width from the aft shaft end to the fore shaft end of the adaptor shaft; and
   a tensile spring formed by selected ones of a plurality of substantially incompressible shear members and a plurality of substantially compressible compression members disposed adjacent to the adaptor shaft between the at least one adaptor lug and the at least one torque transfer lug, the at least one adaptor lug on the adaptor shaft of the drive adaptor pre-loading the selected ones of a plurality of substantially incompressible shear members and a plurality of substantially compressible compression members in conical compression.

2. The progressive shear assembly of claim 1 wherein the substantially non-uniform width of the at least one adaptor lug comprises at least one of a wedge shape, an elliptical shape and a biconcave shape.

3. The progressive shear assembly of claim 1 wherein the selected ones of a plurality of substantially incompressible shear members and a plurality of substantially compressible compression members of the tensile spring comprises a pair of the substantially incompressible shear members and one of the substantially compressible compression members sandwiched between the pair of substantially incompressible shear members.

4. The progressive shear assembly of claim 1 wherein the selected ones of a plurality of substantially incompressible shear members and a plurality of substantially compressible compression members of the tensile spring comprises three of the substantially compressible compression members.

5. The progressive shear assembly of claim 1 wherein the selected ones of a plurality of substantially incompressible shear members and a plurality of substantially compressible compression members of the tensile spring comprises three of the substantially incompressible shear members.

6. The progressive shear assembly of claim 1 further comprising at least one member cavity formed by and between the adaptor shaft, the hub drive sleeve and the at least one adaptor lug and at least one torque transfer lug, and wherein the selected ones of a plurality of substantially incompressible shear members and a plurality of substantially compressible compression members are disposed in the at least one member cavity.

7. The progressive shear assembly of claim 6 wherein the selected ones of a plurality of substantially incompressible shear members and a plurality of substantially compressible compression members comprises a pair of the substantially incompressible shear members and a substantially compressible compression member sandwiched between the pair of substantially incompressible shear members.

8. The progressive shear assembly of claim 6 wherein the selected ones of a plurality of substantially incompressible shear members and a plurality of substantially compressible compression members comprises one of three of the substantially incompressible shear members and three of the substantially incompressible shear members.

9. A progressive shear assembly for coupling a propeller drive shaft to a marine propeller, comprising:
   a propeller hub for coupling to the propeller drive shaft, the propeller hub including:

a propeller hub drive sleeve; and
a plurality of propeller torque transfer lugs on the propeller hub drive sleeve; and
a drive adaptor for coupling to the propeller drive shaft, the drive adaptor including:
an adaptor shaft disposed in the propeller hub drive sleeve of the propeller hub, the adaptor shaft having an aft shaft end and a fore shaft end and tapering from the aft shaft end to the fore shaft end; and
a plurality of adaptor lugs on the adaptor shaft, the plurality of adaptor lugs each having a substantially non-uniform width from the aft shaft end to the fore shaft end of the adaptor shaft;
a plurality of member cavities in spaced-apart relationship to each other around a circumference of the adaptor shaft, the plurality of member cavities formed by and between the adaptor shaft, the propeller hub drive sleeve, the plurality of adaptor lugs and the plurality of propeller torque transfer lugs; and
a tensile spring formed by selected ones of a plurality of substantially incompressible shear members and a plurality of substantially compressible compression members disposed in the plurality of member cavities, the plurality of adaptor lugs on the adaptor shaft of the drive adaptor pre-loading the selected ones of a plurality of substantially incompressible shear members and a plurality of substantially compressible compression members in conical compression.

10. The progressive shear assembly of claim 9 wherein the substantially non-uniform width of the at least one adaptor lug comprises at least one of a wedge shape, an elliptical shape and a biconcave shape.

11. The progressive shear assembly of claim 9 wherein the selected ones of a plurality of substantially incompressible shear members and a plurality of substantially compressible compression members of the tensile spring comprises a pair of the substantially incompressible shear members and one of the substantially compressible compression members sandwiched between the pair of substantially incompressible shear members.

12. The progressive shear assembly of claim 9 wherein the selected ones of a plurality of substantially incompressible shear members and a plurality of substantially compressible compression members of the tensile spring comprises three of the substantially compressible compression members.

13. The progressive shear assembly of claim 9 wherein the selected ones of a plurality of substantially incompressible shear members and a plurality of substantially compressible compression members of the tensile spring comprises three of the substantially incompressible shear members.

14. A progressive shear assembly for coupling a drive to an output, comprising:
a hub for coupling to the output, the hub including:
a hub drive sleeve; and
at least one torque transfer lug on the hub drive sleeve; and
a drive adaptor for coupling to the drive, the drive adaptor including:
an adaptor shaft disposed in the hub drive sleeve of the hub, the adaptor shaft having an aft shaft end and a fore shaft end and tapering from the aft shaft end to the fore shaft end; and
at least one adaptor lug on the adaptor shaft, the at least one adaptor lug having a substantially non-uniform width from the aft shaft end to the fore shaft end of the adaptor shaft; and
a shear assembly sleeve deployable between the adaptor shaft of the drive adaptor and the hub drive sleeve of the hub, the shear assembly sleeve including:
a sleeve wall having a resilient, flexible and bendable or rollable elastomeric or compressible material;
at least one drive input member carried by the sleeve wall, the at least one drive input member including at least one of a substantially incompressible material and a substantially compressible material;
at least one drive slot extending through the sleeve wall adjacent to the at least one drive input member, the at least one adaptor lug insertable through the at least one drive slot and engageable with the at least one drive input member; and
at least one drive output member carried by the sleeve wall in spaced-apart relationship to the at least one drive input member, the at least one drive output member engageable with the at least one torque transfer lug; and
a tensile spring formable by the at least one drive input member and the at least one drive output member, the at least one adaptor lug on the adaptor shaft of the drive adaptor configured to pre-load the at least one drive input member in conical compression.

15. The progressive shear assembly of claim 14 wherein the substantially non-uniform width of the at least one adaptor lug comprises a biconcave shape.

16. The progressive shear assembly of claim 14 wherein the sleeve wall is elongated and rectangular and has a trailing wall edge, a leading wall edge, side wall edges, an outer sleeve surface and an inner sleeve surface, and the at least one drive input member and the at least one drive output member is carried by the outer sleeve surface.

17. The progressive shear assembly of claim 14 wherein the at least one drive input member comprises at least one pair of spaced-apart, adjacent drive input members, and the at least one drive slot is formed by and between the pair of spaced-apart, adjacent drive input members.

18. The progressive shear assembly of claim 14 wherein the at least one drive output member comprises a pair of spaced-apart terminal drive output members and a pair of spaced-apart inside drive output members.

19. The progressive shear assembly of claim 18 further comprising a transfer lug slot between each of the pair of spaced-apart terminal drive output members and the pair of spaced-apart inside drive output members.

20. A shear assembly sleeve deployable between a propeller adaptor shaft of a drive adaptor and a propeller hub drive sleeve of a propeller hub, the shear assembly sleeve including:
a sleeve wall having a resilient, flexible and bendable or rollable elastomeric or compressible material;
at least one drive input member carried by the sleeve wall, the at least one drive input member including at least one of a substantially incompressible material and a substantially compressible material;
at least one drive slot extending through the sleeve wall adjacent to the at least one drive input member, the at least one adaptor lug insertable through the at least one drive slot and engageable with the at least one drive input member; and
at least one drive output member carried by the sleeve wall in spaced-apart relationship to the at least one drive input member, the at least one drive output member engageable with the at least one torque transfer lug; and a tensile spring formable by the at least one drive input member and the at least one drive output member, the at least one adaptor lug on the adaptor shaft of the drive adaptor configured to pre-load the at least one drive input member in conical compression.

* * * * *